(12) United States Patent
Saito et al.

(10) Patent No.: US 8,553,514 B2
(45) Date of Patent: Oct. 8, 2013

(54) OPTICAL RECORDING MEDIUM, RECORDING DEVICE, AND RECORDING METHOD

(75) Inventors: Kimihiro Saito, Tokyo (JP); Seiji Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/521,976

(22) PCT Filed: Dec. 17, 2010

(86) PCT No.: PCT/JP2010/073483
§ 371 (c)(1),
(2), (4) Date: Jul. 12, 2012

(87) PCT Pub. No.: WO2011/086838
PCT Pub. Date: Jul. 21, 2011

(65) Prior Publication Data
US 2012/0300601 A1 Nov. 29, 2012

(30) Foreign Application Priority Data
Jan. 13, 2010 (JP) ................................. 2010-004550

(51) Int. Cl.
*G11B 7/24* (2013.01)
(52) U.S. Cl.
USPC ........................................... 369/94; 369/284
(58) Field of Classification Search
None
See application file for complete search history.

(56) References Cited

U.S. PATENT DOCUMENTS

2012/0182851 A1* 7/2012 Saito et al. .................... 369/111

FOREIGN PATENT DOCUMENTS

| JP | 2008-117502 | 5/2008 |
|----|-------------|--------|
| JP | 2008-293572 | 12/2008 |
| JP | 2009-080929 | 4/2009 |
| JP | 2009-110557 | 5/2009 |
| JP | 2009-181602 | 8/2009 |

OTHER PUBLICATIONS

Saito et al., "Analysis of Micro-Reflector 3-D optical disc recording", 2006, Proc. of SPIE vol. 6282, pp. 1-6.*
Kasami et al., "Large Capacity and High-Data-Rate Phase-Change Disks", Jpn. J. Appl. Phys., vol. 39 (2000), pp. 756.
Ichimura et al., "Proposal for a multilayer read-only-memory optical disk structure", Applied Optics, vol. 45, No. 8 2006, pp. 1794.
Shida et al., "Multilayer Optical Read-Only-Memory Disk Applicable to Blu-ray Disc Standard Using a Photopolymer Sheet with a Recording Capacity of 100 GB", Jpn. J. Appl. Phys., vol. 43 (2004), pp. 4983.

* cited by examiner

*Primary Examiner* — Wayne Young
*Assistant Examiner* — Brian Butcher
(74) *Attorney, Agent, or Firm* — K&L Gates, LLP

(57) ABSTRACT

An optical recording medium includes: N recording layers (where N≥4); a number of kinds of layer intervals between the recording layers adjacent to each other being an integer M equal to or less than a minimum integer equal to or more than $\log_2(N)$; and one or more AB blocks including four recording layers with a first layer interval A, a second layer interval B, and the first layer interval A formed in order in the one or more AB blocks. When the M as the number of kinds of layer intervals is M≥3, the optical recording medium has a part of a third layer interval C as a layer interval between a recording layer forming an AB block and a recording layer adjacent to the recording layer, the adjacent recording layer being included in other than the AB block including the recording layer.

9 Claims, 18 Drawing Sheets

FIG. 1
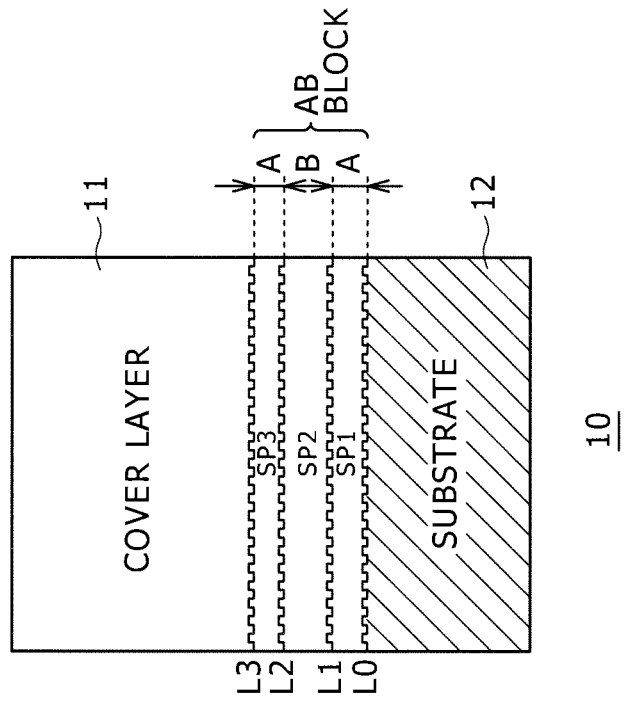
(b)
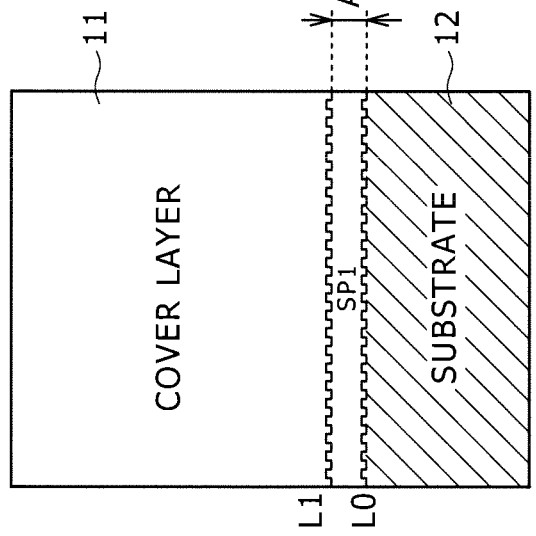
(a)

FIG. 4
(a)
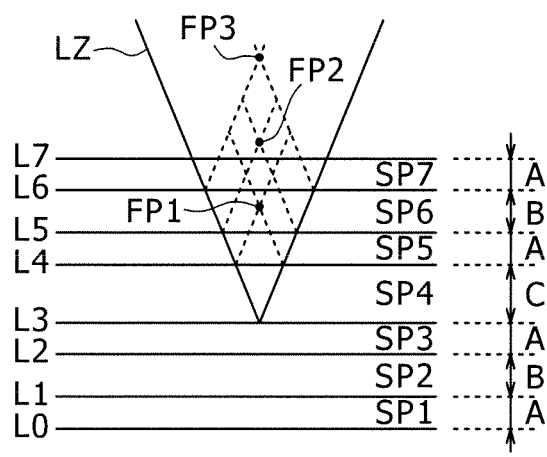
(b)
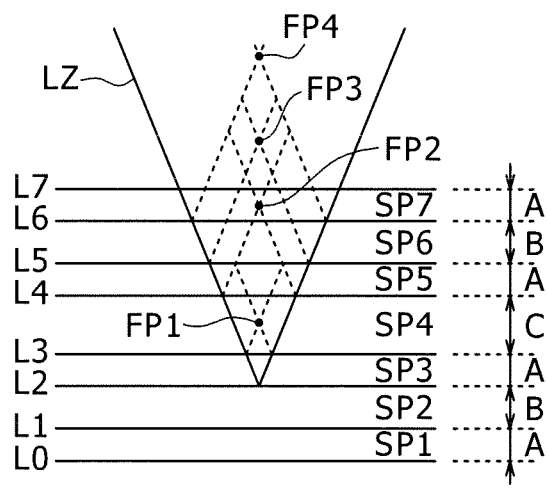

POSITIVE TYPE MICROHOLOGRAM

OPTICAL RECORDING MEDIUM, RECORDING DEVICE, AND RECORDING METHOD

CROSS REFERENCES TO RELATED APPLICATIONS

The present application is a national stage of International Application No. PCT/JP2010/073483 filed on Dec. 17, 2010 and claims priority to Japanese Patent Application No. 2010-004550 filed on Jan. 13, 2010, the disclosure of which is incorporated herein by reference.

BACKGROUND

The present invention relates to an optical recording medium, and particularly to a recording device and a recording method for a bulk type optical recording medium.

BACKGROUND ART

So-called optical disks such for example as a CD (Compact Disc), a DVD (Digital Versatile Disc), and a BD (Blu-ray Disc: registered trademark) have spread as optical recording media on which signals are recorded/reproduced by application of light. Systems for these optical disks read minute changes in reflectance that are formed on one side of a disk on a noncontact basis by application of laser light via an objective lens. As is well known, the size of a light spot on a disk is given by $\lambda/NA$ ($\lambda$: the wavelength of laser light, NA: a numerical aperture), and resolution is proportional to this value. Details of a Blu-ray Disc corresponding to about 25 GB as a disk having a diameter of 12 cm, for example, are disclosed in the above Non-Patent Document 1. In addition, Non-Patent Documents 2 and 3 propose multilayer recording type optical disks. When recording and reproduction is performed in multiple layers, a recording capacity of one disk is multiplied by the number of the layers.

PRIOR ART DOCUMENTS

Non-Patent Documents

Non-Patent Document 1: Yutaka KASAMI, Yuji KURODA, Katsuhiro SEO, Osamu KAWAKUBO, Shigeki TAKAGAWA, Masumi ONO and Masahiro YAMADA "Large Capacity and High-Data-Rate Phase-Change Disks" Jpn. J. Appl. Phys., Vol. 39 (2000), pp 756

Non-Patent Document 2: Isao Ichimura, Kimihiro Saito, Takeshi Yamasaki, and Kiyoshi Osato "Proposal for a multilayer read-only-memory optical disk structure" Applied Optics, Vol. 45, No. 8 2006, pp 1794

Non-Patent Document 3: Noriyoshi SHIDA, Takanobu HIGUCHI, Yasuo HOSODA, Hiroko MIYOSHI, Akio NAKANO and Katsunori TSUCHIYA "Multilayer Optical Read-Only-Memory Disk Applicable to Blu-ray Disc Standard Using a Photopolymer Sheet with a Recording Capacity of 100 GB" Jpn. J. Appl. Phys., Vol. 43 (2004), pp 4983

SUMMARY

Technical Problem

FIG. 17 shows an example of multilayer recording type optical disks shown in Non-Patent Document 2. FIG. 17(a) represents an example of a four-layer disk. The four-layer disk has a structure formed by laminating a recording layer L0, a spacer layer SP1, a recording layer L1, a spacer layer SP2, a recording layer L2, a spacer layer SP3, a recording layer L3, and a cover layer 101 of 70 μm in order on a substrate 102 of 1.1 mm. In this example, the spacer layer SP1 is 11.5 μm, the spacer layer SP2 is 15.0 μm, and the spacer layer SP3 is 9.5 μm. That is, layer intervals between the recording layers L0, L1, L2, and L3 are set so as to be different from each other. In a case of a reproduction-only type disk (ROM disk), the recording layers L0, L1, L2, and L3 have data recorded therein by an embossed pit string, for example. In addition, a total reflection film is formed in the deepest recording layer L0, and a semitransparent reflective film is formed in the other recording layers L1, L2, and L3.

In addition, FIG. 17(b) represents an example of an eight-layer disk. Recording layers L0 to L7 are formed between a substrate 102 of 1.1 mm and a cover layer of 41 μm with spacer layers SP1 to SP7 interposed between the recording layers L0 to L7. Also in this case, the thicknesses of the spacer layers SP1 to SP7, that is, layer intervals are not uniform.

The layer intervals are not uniform thicknesses as in these for the following reasons. FIG. 18(a) represents a case of a four-layer disk in which spacer layers SP1 to SP3 have a same thickness. Suppose in this case that a recording layer L1 is irradiated with laser light LZ. As shown in FIG. 18(b), when the laser light is focused on the recording layer L1, return light modulated by the embossed pit string of the recording layer L1 is obtained. Information recorded in the recording layer L1 can be read by detecting the return light with a photodetector.

However, in a case of a multilayer disk, a stray light component modulated by another recording layer occurs in the return light guided to the photodetector. As indicated by a broken line in FIG. 18(b), a component as a part of the laser light LZ focused on the recording layer L1 is reflected by the recording layer L2, and becomes stray light. This stray light is further reflected by each of the recording layers L3 and L2, and becomes a part of the return light. This is a light component modulated by the recording layer L3. When the layer intervals are uniform at this time, the focus point FP of the stray light component indicated by the broken line is on the recording layer L3. That is, the stray light component is applied to the embossed pit string of the recording layer L3 in a focused state, and thereby becomes a modulated component of a relatively high intensity. Such a stray light component is mixed into the return light to the photodetector, thereby causing a so-called interlayer crosstalk and thus decreasing the quality of a reproduced signal.

When the layer intervals are made different from each other in this case, the effect of the interlayer crosstalk due to such stray light can be reduced or eliminated. FIG. 18(c) represents an example in which layer intervals between recording layers L0 to L3 are made different from each other by setting spacer layers SP1 to SP3 to respective different thicknesses. Also in this case, when laser light LZ is focused on the recording layer L1, a component as a part of the laser light LZ is reflected by the recording layer L2, and becomes stray light, as indicated by a broken line in FIG. 18(d), for example. This stray light is reflected by each of the recording layers L3 and L2, and becomes a part of return light. However, in this case, because of the different thicknesses of the spacer layers SP2 and SP3, the focus point FP of the stray light component is not on the recording layer L3, as in the figure. The recording layer L3 is thus irradiated with the stray light component in a so-called out-of-focus state. This stray light component is subjected to modulation by the pit string of the recording layer L3. However, the stray light component is not focused, and thus modulation intensity becomes very weak. Therefore, the stray light component hardly affects a reproduced signal even when mixed in as a part of return light to a photodetector.

That is, when layer intervals are made different from each other in a multilayer disk, the modulation intensity of a stray light component modulated by another recording layer than a target recording layer can be lowered. As a result, an interlayer crosstalk can be reduced to such a level as not to affect a reproduced signal.

Thus making layer intervals different from each other in a multilayer disk can improve the quality of a reproduced signal. However, in that case, there is a disadvantage in that many kinds of settings of spacer layer thickness need to be provided in the manufactured constitution of a disk. Increases in the number of layers to 8 layers, 16 layers, and more, in particular, have recently been promoted. However, providing a large number of kinds of film thickness settings for spacer layers SP and changing a setting in each of stages of formation of the spacer layers in a case of forming the spacer layers SP by sputtering, for example, is disadvantageous in terms of process efficiency and manufacturing cost.

Accordingly, the present invention proposes a structure of an optical recording medium such as can eliminate the effect of an interlayer crosstalk with a minimum number of kinds of layer intervals.

Technical Solution

An optical recording medium according to the present invention includes: N recording layers (where N≥4); a number of kinds of layer intervals between the recording layers adjacent to each other being an integer M equal to or less than a minimum integer equal to or more than $\log_2(N)$; and one or more blocks including four recording layers with a first layer interval, a second layer interval, and the first layer interval formed in order in the one or more blocks. For example, a four-layer recording medium has a minimum integer M=2 equal to or more than $\log_2(4)$, and has one block including four recording layers with a first layer interval, a second layer interval, and the first layer interval formed in order in the one block. In addition, an eight-layer recording medium, for example, has a minimum integer M=3 equal to or more than $\log_2(8)$, and has two blocks including four recording layers with a first layer interval, a second layer interval, and the first layer interval formed in order in the two blocks. Then, a layer interval between the blocks is a third layer interval.

In addition, a number of the recording layers is such that the M as the number of kinds of layer intervals is M≥3, and the optical recording medium has each of parts of respective layer intervals from a third layer interval to an Mth layer interval as a layer interval between a recording layer forming the block and a recording layer adjacent to the recording layer, the adjacent recording layer being included in other than the block including the recording layer. In addition, in this case, the first layer interval<the second layer interval<the third layer interval< . . . <the Mth layer interval. As an example where M≥3, when the optical recording medium has five to eight recording layers, and the above M=3, the optical recording medium has a part of a third layer interval as a layer interval between a recording layer forming the block and a recording layer adjacent to the recording layer, the adjacent recording layer being included in other than the block including the recording layer. In addition, when the optical recording medium has 9 to 16 recording layers, and the above M=4, the optical recording medium has each of a part of a third layer interval and a part of a fourth layer interval as a layer interval between a recording layer forming the block and a recording layer adjacent to the recording layer, the adjacent recording layer being included in other than the block including the recording layer. In addition, when the optical recording medium has 17 to 32 recording layers, and the above M=5, the optical recording medium has each of a part of a third layer interval, a part of a fourth layer interval, and a part of a fifth layer interval as a layer interval between a recording layer forming the block and a recording layer adjacent to the recording layer, the adjacent recording layer being included in other than the block including the recording layer.

When the number of the recording layers is N=$2^y$ (y is an integer of three or more), the Mth layer interval is set between an (N/2)th recording layer and an {(N/2)+1}th recording layer, a first recording layer to the (N/2)th recording layer and the {(N/2)+1}th recording layer to an Nth recording layer each have at least one or more blocks, and settings of respective layer intervals from the first recording layer to the (N/2)th recording layer are identical to settings of respective layer intervals from the {(N/2)+1}th recording layer to the Nth recording layer. This corresponds to cases where the number of recording layers is 8, 16, 32, . . . . To illustrate by a case of 16 layers (M=4), for example, a fourth layer interval is set between an eighth recording layer and a ninth recording layer, a first recording layer to the eighth recording layer and the ninth recording layer to a sixteenth recording layer each have two blocks, and settings of respective layer intervals from the first recording layer to the eighth recording layer are identical to settings of respective layer intervals from the ninth recording layer to the sixteenth recording layer. That is, the layer intervals are set symmetrically with respect to a center between the eighth recording layer and the ninth recording layer.

In addition, the following is for cases in which the number N of recording layers is $2^{y-1}$<N<$2^y$ (y is an integer of three or more). Suppose that N'=$2^y$, that the Mth layer interval is set between an (N'/2)th recording layer and an {(N'/2)+1}th recording layer, that a first recording layer to the (N'/2)th recording layer and the {(N'/2)+1}th recording layer to an N'th recording layer each have at least one or more blocks, and that settings of respective layer intervals from the first recording layer to the (N'/2)th recording layer are identical to settings of respective layer intervals from the {(N'/2)+1}th recording layer to the N'th recording layer. The N recording layers are formed with layer interval settings in a case of extracting N consecutive recording layers from the first recording layer to the N'th recording layer at this time. This corresponds to cases where the number of recording layers is 5 to 7, 9 to 15, 17 to 31, . . . . An illustration will be given in a case of N=12 (M=4), for example. First, suppose that N'=16 (incidentally, M=4 also in the case of 16 layers). In this case, a fourth layer interval is set between an eighth recording layer and a ninth recording layer, a first recording layer to the eighth recording layer and the ninth recording layer to a sixteenth recording layer each have two blocks, and settings of respective layer intervals from the first recording layer to the eighth recording layer are identical to settings of respective layer intervals from the ninth recording layer to the sixteenth recording layer. That is, the layer intervals are set symmetrically with respect to a center between the eighth recording layer and the ninth recording layer. The first to twelfth recording layers are formed with layer interval settings in a case of extracting N consecutive recording layers (12 recording layers in this case) from the 16 layers set as described above.

A recording device according to the present invention includes: an optical pickup for irradiating, with laser light, an optical recording medium having a bulk layer in which to record optical recording information by irradiation with laser light and form a plurality of recording layers in which the optical recording information is recorded; a focus control section configured to control a focal position of the laser light within the bulk layer; and a control section configured to give an instruction on the focal position to the focus control section so that each recording layer is formed by recording operation with the laser light such that N recording layers (where N≥4) are formed within the bulk layer, a number of kinds of layer intervals between the recording layers adjacent to each other is an integer M equal to or less than a minimum integer equal to or more than $\log_2(N)$, and the bulk layer has one or more blocks including four recording layers with a first layer interval, a second layer interval, and the first layer interval formed in order in the one or more blocks.

A recording method according to the present invention as a recording method of a recording device, the recording device including an optical pickup for irradiating, with laser light, an optical recording medium having a bulk layer in which to record optical recording information by irradiation with laser light and form a plurality of recording layers in which the optical recording information is recorded, and a focus control section configured to control a focal position of the laser light within the bulk layer, performs recording operation with the laser light after the focus control section controls the focal position according to each recording layer, so as to form each recording layer such that N recording layers (where N≥4) are formed within the bulk layer, a number of kinds of layer intervals between the recording layers adjacent to each other is an integer M equal to or less than a minimum integer equal to or more than $\log_2(N)$, and the bulk layer has one or more blocks including four recording layers with a first layer interval, a second layer interval, and the first layer interval formed in order in the one or more blocks.

The layer intervals between the recording layers in the optical recording medium according to the present invention or the layer intervals between the recording layers in the bulk type optical recording medium which recording layers are formed by recording performed by the recording device or the recording method according to the present invention have layer interval settings that can eliminate the effect of an interlayer crosstalk with a minimum number of kinds of layer intervals.

Advantageous Effect

The optical recording medium according to the present invention is, as a multilayer optical recording medium having four layers or more, an optical recording medium that can eliminate the effect of an interlayer crosstalk at a time of reproduction with a minimum number of kinds of layer intervals. It is therefore possible to minimize kinds of film thickness settings when forming spacer layers between recording layers by sputtering, for example, and thus improve manufacturing efficiency.

In addition, according to the recording device and the recording method according to the present invention, it is possible to realize an optical recording medium that can eliminate the effect of an interlayer crosstalk at a time of reproduction with a minimum number of kinds of layer intervals when four or more recording layers are formed by recording operation on a bulk type multilayer optical recording medium. Therefore, simplification and higher efficiency of setting of a focal position by focus control at a time of recording can be achieved.

Additional features and advantages are described herein, and will be apparent from the following Detailed Description and the figures.

BRIEF DESCRIPTION OF THE FIGURES

FIG. 1 is a diagram of assistance in explaining a four-layer recording medium according to a first embodiment of the present invention.

FIG. 4 is a diagram of assistance in explaining stray light in the eight-layer recording medium according to the first embodiment.

DETAILED DESCRIPTION

Figure 2:
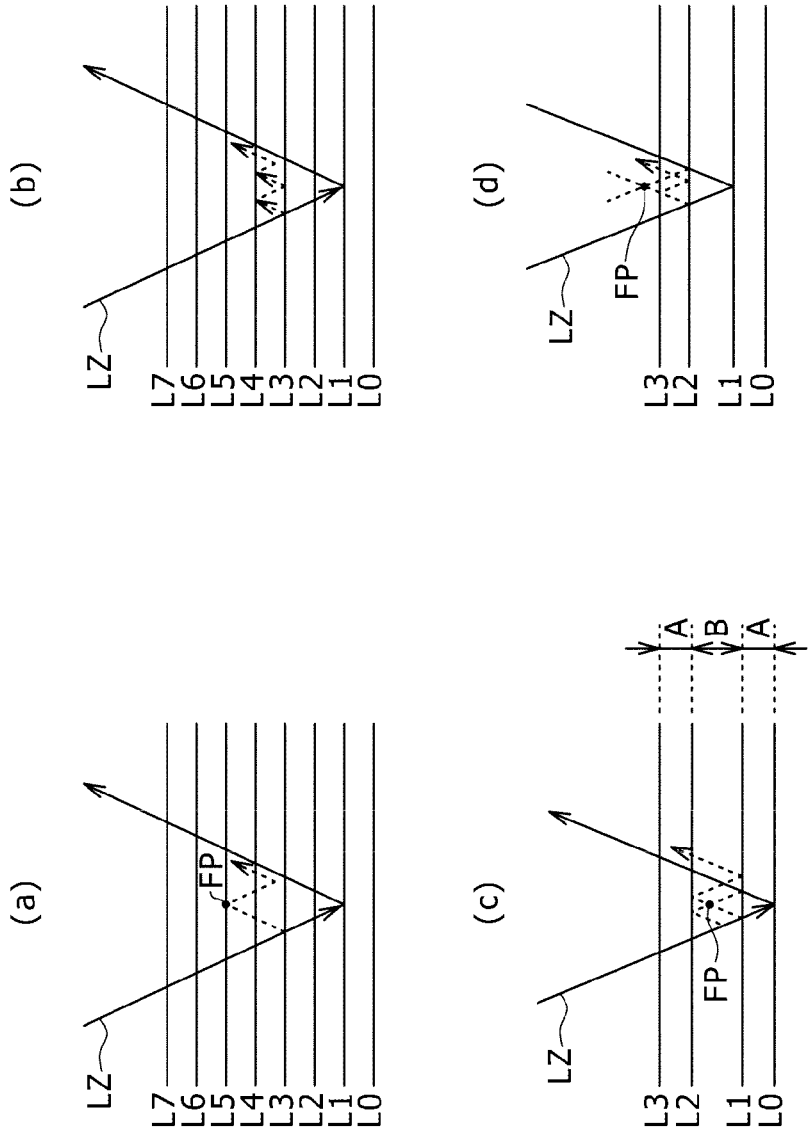
FIG. 2 is a diagram of assistance in explaining stray light in an optical recording medium according to the first embodiment.

Embodiments of the present invention will be described in the following order.
<1. First Embodiment>
[1-1: N-layer (N=$2^y$) Recording Medium]
[1-2: N-layer ($2^{y-1}$<N<$2^y$) Recording Medium]
<2. Second Embodiment: Recording Device for Bulk Type Optical Recording Medium>
[2-1: Structure of Optical Recording Medium]
[2-2: Servo Control]
[2-3: Recording and Reproducing Optical System]
[2-4: Recording Process]

<1. First Embodiment>
1-1: N-layer (N=$2^y$) Recording Medium

An optical recording medium as a first embodiment will be described. This optical recording medium can be realized as a reproduction-only optical disk, a write-once optical disk, or a rewritable optical disk in Blu-ray Discs, for example.

For example, a reproduction-only Blu-ray Disc (BD-ROM) has a diameter of 120 mm and a disk thickness of 1.2 mm as a disk size. That is, in these respects, a BD-ROM is similar, in external appearance, to a disk of a CD system or a disk of a DVD system.

Then, a so-called blue laser is used as a laser for recording/reproduction, and an optical system has a high NA (for example NA=0.85). In a BD-ROM, for example, an embossed pit string in a spiral shape is formed on a substrate (disk substrate) formed by a resin such as polycarbonate having a thickness of about 1.1 mm, and a surface having depressions and projections formed by the pit string is coated with a reflective film to form a recording layer. In addition, in the BD-ROM, not only one-layer disks having one recording layer but also multiple-layer disks having two recording layers, three recording layers, . . . , and n recording layers have been developed. Each recording layer is formed on the disk substrate with a spacer layer interposed between the recording layers. Of course, a recording capacity can be greatly increased by providing a large number of recording layers. Then, a cover layer of a predetermined thickness is further formed, whereby a disk having a thickness of 1.2 mm is formed.

In addition, a BD-R (Blu-ray Disc Recordable) and a BD-RE (Blu-ray Disc Rewritable) are known as recordable disks. A BD-R is a write-once disk in the Blu-ray Disc standards. A BD-RE is a rewritable disk in the Blu-ray Disc standards. BD-R and BD-RE disks have only a groove formed in advance on a disk substrate, and have no pit string. Of these recordable disks, disks having multiple recording layers have also been developed.

Incidentally, a recording medium according to the present embodiment having a structure to be described in the following is not limited to optical disks of the Blu-ray Disc system, but has a structure realizable as that of a Blu-ray Disc or a next-generation disk. In addition, the recording medium according to the present embodiment is not necessarily limited to disk type recording media, but is also applicable to other kinds of recording media such for example as an optical recording medium having the shape of a card. That is, the recording medium according to the present embodiment is widely applicable as multilayer optical recording medium having four layers or more.

First, the optical recording medium according to the present embodiment is based on the following premises. FIG. 2(a) schematically shows recording layers L0 to L8 in an eight-layer recording medium, for example. In this case, when the recording layer L1 is to be reproduced, laser light LZ is focused on the recording layer L1 as indicated by a solid line in the figure. At this time, as indicated by a broken line, a stray light component is focused on another recording layer L5 (focus point FP), thereby modulated by the recording layer L5, and mixed into return light as a modulated component of a relatively high intensity. This constitutes an interlayer crosstalk, as described above. In addition, as indicated by a broken line in FIG. 2(b), there is a component reflected twice and mixed into the return light. In the present embodiment, cases of being reflected by a certain recording layer only once and focused on another recording layer as in FIG. 2(a) are avoided, and cases of being focused as a result of multiple reflection as shown in FIG. 2(b) are ignored. This is because in cases of multiple reflection, the number of times of reflection is increased by two or more, so that an amount of light is small and produces little effect.

First, a four-layer recording medium will be described as the present embodiment with reference to FIG. 1(b). Incidentally, FIG. 1(a) shows an example of a structure of a two-layer recording medium for reference. As in FIG. 1(a), in the case of the two-layer recording medium, recording layers L0 and L1 are formed between a substrate 12 and a cover layer 11. A spacer layer SP1 is formed between the recording layers L0 and L1. Such a two-layer structure is extended to develop recording media having more layers such as three layers, four layers, . . . .

As shown in FIG. 1(b), the four-layer recording medium according to the present embodiment has recording layers L0, L1, L2, and L3 formed between a substrate 12 and a cover layer 11. Spacer layers SP1, SP2, and SP3 are formed between the recording layers L0, L1, L2, and L3. In the case of the above-described Blu-ray Disc, for example, the substrate 12 has a thickness of about 1.1 mm, and a thickness from the recording layer L0 to the surface of the cover layer 11 is about 100 µm, so that the disk having a thickness of 12 mm is formed. Each of the recording layers L0 to L3 has an embossed pit string and a wobbling groove formed therein.

The four-layer recording medium in the present example has two kinds as kinds of layer intervals, that is, a first layer interval A and a second layer interval B as shown in the figure. Specifically, L0-L1 layer interval (thickness of the spacer layer SP1) . . . A L1-L2 layer interval (thickness of the spacer layer SP2) . . . B L2-L3 layer interval (thickness of the spacer layer SP3) . . . A In this example, A<B. For example, A=9 µm, and B=10 µm.

According to such a layer structure, stray light being focused on another recording layer as shown in FIG. 2(a) can be avoided. Description will be made with reference to FIGS. 2(c) and 2(d). Consideration will be given to a case where the recording layer L0 is set as a reproduction object as shown in FIG. 2(c), for example. When laser light LZ is focused on the recording layer L0, as indicated by a broken line, a component as a part of the laser light LZ is reflected by the recording layer L1 on a side nearer to a laser incidence surface, and becomes stray light. This stray light is further reflected by each of the recording layers L1 and L2, and becomes a part of return light. However, in this case, the L0-L1 layer interval A is a different layer interval from the L1-L2 layer interval B. Therefore, the focus point FP of the stray light component is not on the recording layer L2 as shown in the figure. The recording layer L2 is thus irradiated with the stray light component in a so-called out-of-focus state. This stray light component is subjected to modulation by the pit string of the recording layer L3. However, the stray light component is not focused, and thus modulation intensity becomes very weak. Therefore, the stray light component hardly affects a reproduced signal even when mixed in as a part of the return light to a photodetector. Though not shown in the figure, the laser light LZ focused on the recording layer L0 also includes a stray light component reflected by the recording layer L2. However, the stray light component does not have a focal position on the recording layer L3, either.

The same is also true for a case where the recording layer L1 is set as a reproduction object as shown in FIG. 2(d). When laser light LZ is focused on the recording layer L1, as indicated by a broken line, a component as a part of the laser light LZ is reflected by the recording layer L2, and becomes stray light. However, in this case, the L1-L2 layer interval B is a different layer interval from the L2-L3 layer interval A. Therefore the focus point FP of the stray light component is not on the recording layer L3 as shown in the figure. Thus, the modulation intensity of the stray light component in the return light is very weak, and hardly affects a reproduced signal.

Figure 17:
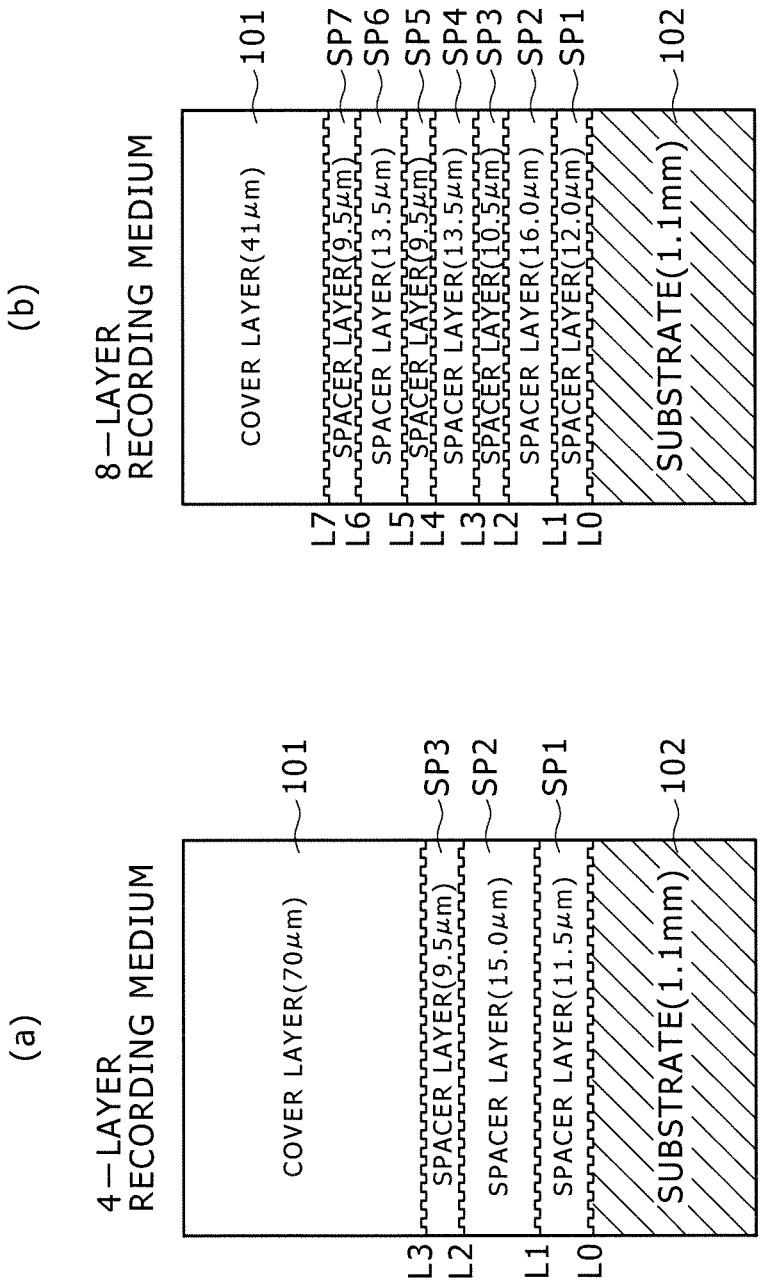
FIG. 17 is a diagram of assistance in explaining a conventional four-layer disk and a conventional eight-layer disk.
Figure 18:
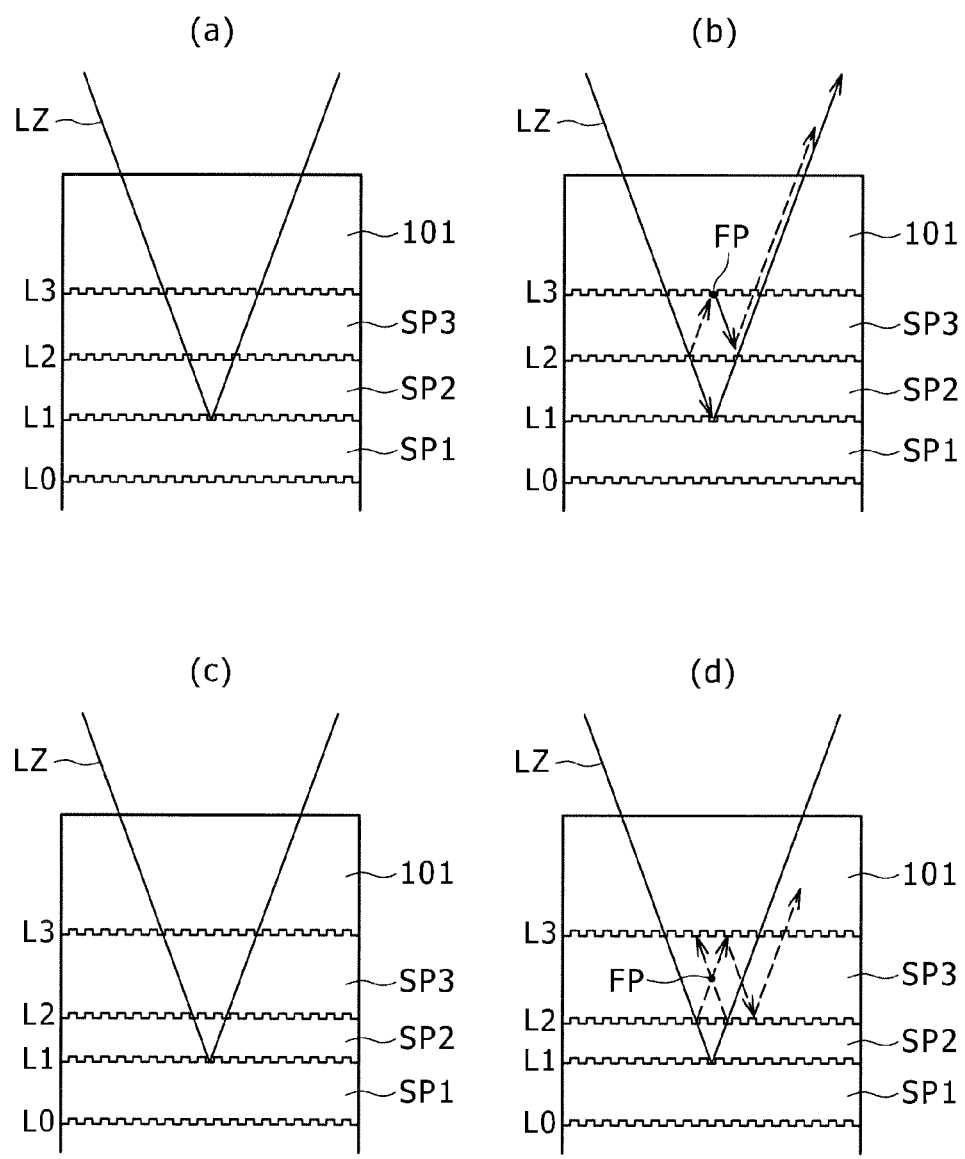
FIG. 18 is a diagram of assistance in explaining layer intervals set so as to be different from each other.

An ability itself to reduce the effect of an interlayer crosstalk with such different layer intervals is similar to that described with reference to FIG. 17 and FIG. 18. However, the present embodiment can achieve a similar effect with a small number of kinds of layer intervals. Specifically, the four-layer recording medium according to the present embodiment has four recording layers L0 to L3, and the number of kinds of layer intervals between the recording layers adjacent to each other is M=2, where M is a minimum integer equal to or more than $\log_2(4)$. That is, the four-layer recording medium according to the present embodiment has two kinds of layer intervals A and B. Then, the four-layer recording medium according to the present embodiment has one block of four recording layers (an "AB block" shown in FIG. 1(b)) in which block the first layer interval A, the second layer interval B, and the first layer interval A are formed in order. Whereas for example the four-layer disk described in FIG. 17(a) has three kinds of layer intervals, it suffices to have two kinds of layer intervals in the present example.

Further, recording media having N layers (N=$2^y$) according to embodiments, that is, recording media having 8 layers, 16 layers, 32 layers, . . . can be formed by extending this AB block, that is, the constitution including four recording layers with the layer intervals A-B-A.

Figure 3:
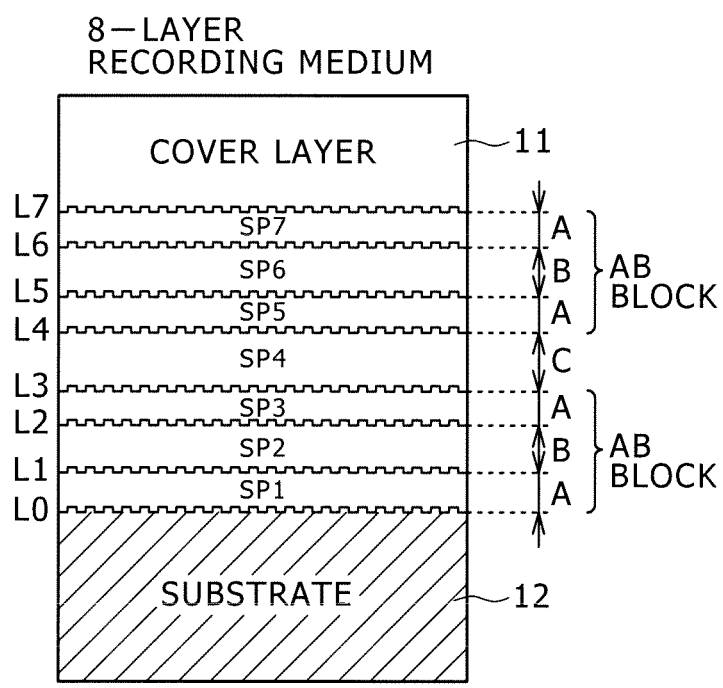
FIG. 3 is a diagram of assistance in explaining an eight-layer recording medium according to the first embodiment.

An example of an eight-layer recording medium is shown in FIG. 3. In the case of the eight-layer recording medium, two AB blocks as described above are used, and a third layer interval C is set between the AB blocks. As shown in FIG. 3, recording layers L0 to L7 are formed between a substrate 12 and a cover layer 11. Spacer layers SP1 to SP7 are formed between the recording layers L0, L1, L2, . . . , and L7.

Then, three kinds of layer intervals, that is, a first layer interval A, a second layer interval B, and a third layer interval C are provided as kinds of layer intervals. Specifically, L0-L1 layer interval (thickness of the spacer layer SP1) . . . A
L1-L2 layer interval (thickness of the spacer layer SP2) . . . B
L2-L3 layer interval (thickness of the spacer layer SP3) . . . A
L3-L4 layer interval (thickness of the spacer layer SP4) . . . C
L4-L5 layer interval (thickness of the spacer layer SP5) . . . A
L5-L6 layer interval (thickness of the spacer layer SP6) . . . B
L6-L7 layer interval (thickness of the spacer layer SP7) . . . A
In this example, A<B<C. For example, A=9 μm, B=10 μm, and C=11 μm.

Even with such a layer structure, stray light being focused on another recording layer as shown in FIG. 2(a) can be avoided. Cases where the recording layers L4 and L5 are set as a reproduction object can be considered to be similar to the cases of FIGS. 2(c) and 2(d) described for the above four-layer recording medium. FIG. 4(a) represents a case where the recording layer L3 is set as a reproduction object. Specifically, when laser light LZ is focused on the recording layer L3, as indicated by broken lines, a component as a part of the laser light LZ is reflected by recording layers on a side nearer to a laser incidence surface, such as the recording layer L4 and the recording layer L5, and becomes stray light. However, none of the focus point FP1 of the stray light reflected by the recording layer L4, the focus point FP2 of the stray light reflected by the recording layer L5, and the focus point FP3 of the stray light reflected by the recording layer L6 are on recording layers. This is because the L3-L4 layer interval is C. Thus, modulation intensity in the stray light components is very weak, and hardly affects a reproduced signal even when the stray light components are mixed in as a part of return light to a photodetector.

The same is also true for a case where the recording layer L2 is set as a reproduction object as shown in FIG. 4(b). When laser light LZ is focused on the recording layer L2, as indicated by broken lines, a component as a part of the laser light LZ is reflected by recording layers on a side nearer to a laser incidence surface, and becomes stray light. However, none of the focus point FP1 of the stray light reflected by the recording layer L3, the focus point FP2 of the stray light reflected by the recording layer L4, the focus point FP3 of the stray light reflected by the recording layer L5, and the focus point FP4 of the stray light reflected by the recording layer L6 are on recording layers. This is because the L3-L4 layer interval is C and the L2-L3 layer interval is A. Thus, modulation intensity in the stray light components is very weak, and hardly affects a reproduced signal even when the stray light components are mixed in as a part of return light to a photodetector.

The same is also true for the recording layers L1 and L0. As for a case where the recording layer L0 is set as a reproduction object, for example, stray light reflected by the recording layers L1 and L2 within the same AB block as the recording layer L0 is not focused on the recording layers L2 and L3. Because of the A-B-A layer interval setting, consideration can be given in a similar manner to FIGS. 2(c) and 2(d). Stray light reflected by the recording layers L3 to L6 can be considered to be similar to that of FIG. 4(b) described above, and none of the stray light is focused on recording layers. Thus, the stray light hardly affects a reproduced signal.

Thus, the eight-layer recording medium can reduce an interlayer crosstalk with only three kinds of layer intervals. Specifically, the eight-layer recording medium in the present example has eight recording layers L0 to L7, and the number of kinds of layer intervals between the recording layers adjacent to each other is M=3, where M is a minimum integer equal to or more than $\log_2(8)$. That is, the eight-layer recording medium according to the present embodiment has three kinds of layer intervals A, B, and C. Then, the eight-layer recording medium according to the present embodiment has two "AB blocks" of four recording layers in which blocks the first layer interval A, the second layer interval B, and the first layer interval A are formed in order. Further, a layer interval between a recording layer forming an AB block and a recording layer adjacent to the recording layer, the adjacent recording layer being included in other than the AB block including the recording layer, that is, a layer interval between the recording layers L3 and L4 as a layer interval between the two AB blocks in the present example is the third layer interval C. This constitution makes it possible to take measures against an interlayer crosstalk with three kinds of layer intervals even in the case of an eight-layer recording medium.

Figure 5:
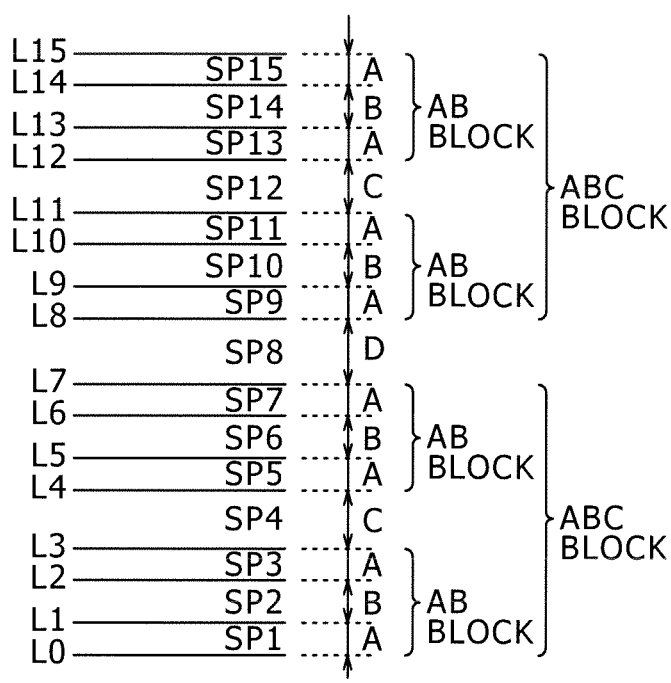
FIG. 5 is a diagram of assistance in explaining a 16-layer recording medium according to the first embodiment.

It suffices to consider a 16-layer recording medium and a 32-layer recording medium by extending the above constitution. FIG. 5 shows the layer intervals of a 16-layer recording medium. In this case, two "ABC blocks" corresponding to the constitution of the above eight-layer recording medium are used, and a fourth layer interval D is set between the ABC blocks. In this example, A<B<C<D. For example, A=9 µm, B=10 µm, C=11 µm, and D=13 µm.

The 16-layer recording medium in the present example has 16 recording layers L0 to L15, and the number of kinds of layer intervals between the recording layers adjacent to each other is M=4, where M is a minimum integer equal to or more than $\log_2(16)$. That is, the 16-layer recording medium in the present example has four kinds of layer intervals A, B, C, and D. Then, the 16-layer recording medium in the present example has four "AB blocks" of four recording layers in which blocks the first layer interval A, the second layer interval B, and the first layer interval A are formed in order. The 16-layer recording medium in the present example further has each of parts of the third layer interval C and a part of the fourth layer interval D as a layer interval between a recording layer forming an AB block and a recording layer adjacent to the recording layer, the adjacent recording layer being included in other than the AB block including the recording layer. In the present example, an L3-L4 layer interval between two AB blocks and an L11-L12 layer interval between two AB blocks are the third layer interval C, and an L7-L8 layer interval is the fourth layer interval D. This constitution makes it possible to reduce an interlayer crosstalk with only four kinds of layer intervals even in the case of the 16-layer recording medium.

Figure 6:
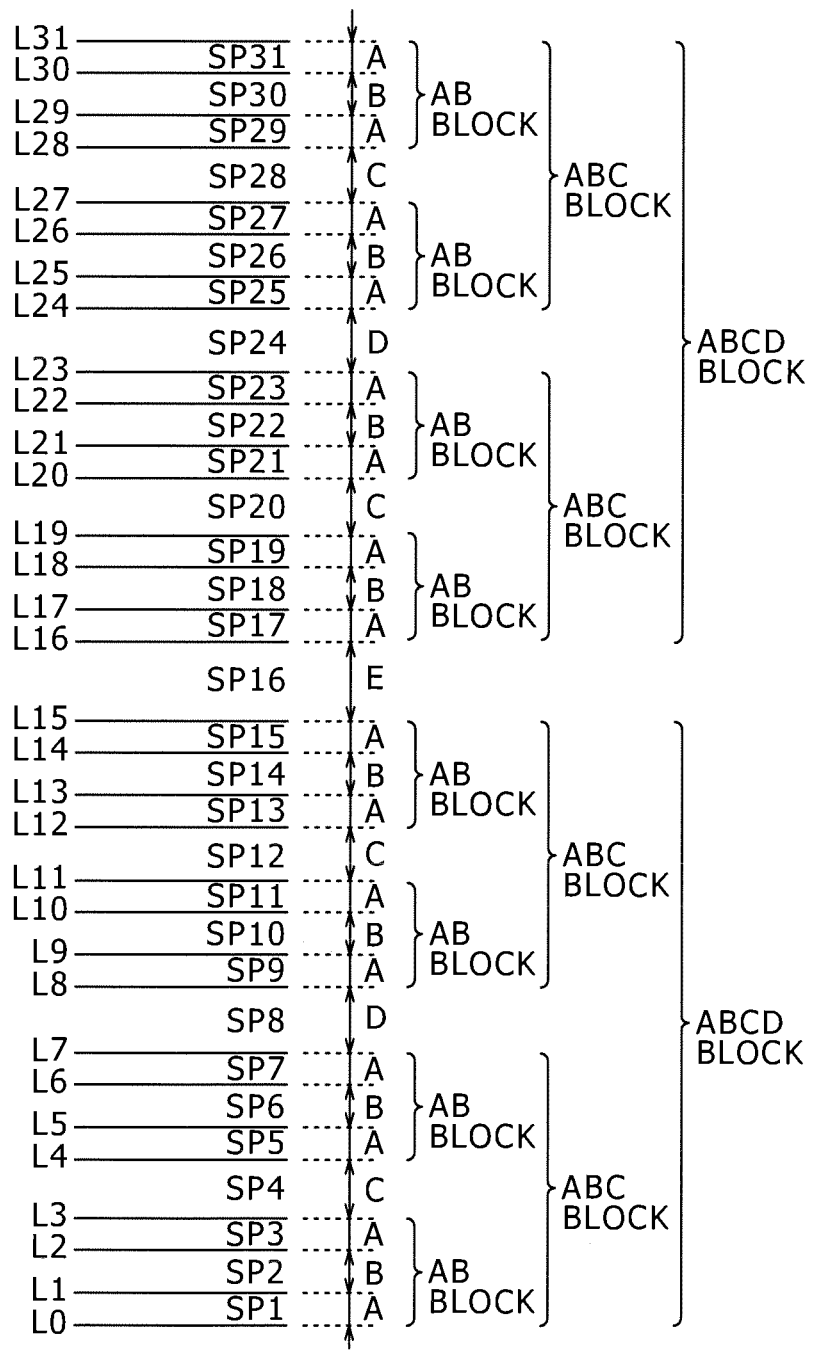
FIG. 6 is a diagram of assistance in explaining a 32-layer recording medium according to the first embodiment.

FIG. 6 shows the layer intervals of a 32-layer recording medium. In this case, two "ABCD blocks" corresponding to the constitution of the above 16-layer recording medium are used, and a fifth layer interval E is set between the ABCD blocks. In this example, A<B<C<D<E. For example, A=9 µm, B=10 µm, C=11 µm, D=13 µm, and E=15 µm.

The 32-layer recording medium in the present example has 32 recording layers L0 to L31, and the number of kinds of layer intervals between the recording layers adjacent to each other is M=5, where M is a minimum integer equal to or more than $\log_2(32)$. That is, the 32-layer recording medium in the present example has five kinds of layer intervals A, B, C, D, and E. Then, the 32-layer recording medium in the present example has eight "AB blocks" of four recording layers in which blocks the first layer interval A, the second layer interval B, and the first layer interval A are formed in order. The 32-layer recording medium in the present example further has each of parts of the third layer interval C, parts of the fourth layer interval D, and a part of the fifth layer interval as a layer interval between a recording layer forming an AB block and a recording layer adjacent to the recording layer, the adjacent recording layer being included in other than the AB block including the recording layer. In the present example, an L3-L4 layer interval between two AB blocks, an L11-L12 layer interval between two AB blocks, an L19-L20 layer interval between two AB blocks, and an L27-L28 layer interval between two AB blocks are the third layer interval C. In addition, an L7-L8 layer interval and an L23-L24 layer interval are the fourth layer interval D, and an L15-L16 layer interval is the fifth layer interval E. This constitution makes it possible to reduce an interlayer crosstalk with only five kinds of layer intervals even in the case of the 32-layer recording medium.

Though not shown in the figures, recording media having more layers such as a 64-layer recording medium and a 128-layer recording medium can be considered in a similar manner.

Recording media having a number N of recording layers where N=$2^y$, such as 4 layers, 8 layers, 16 layers, and 32 layers, have been described above. These optical recording media according to the present embodiment are optical recording media capable of eliminating the effect of an interlayer crosstalk at a time of reproduction with a minimum number of kinds of layer intervals as multilayer optical recording media having four layers or more. It is therefore possible to minimize kinds of film thickness settings when forming spacer layers between recording layers by sputtering, for example, and thus improve manufacturing efficiency. In addition, when each spacer layer is formed by a sheet material, kinds of thicknesses of sheet material can be reduced. The optical recording media according to the present embodiment are thus suitable for improving manufacturing efficiency and reducing cost. Further, a method of laminating sheets fabricated in units of AB blocks to each other can be adopted.

In addition, when the number of recording layers is N=$2^y$, and y is 3 or more, that is, in the cases of 8 layers, 16 layers, 32 layers, . . . , in particular, the following features are obtained. The Mth layer interval is present between the (N/2)th recording layer and the {(N/2)+1}th recording layer. The first recording layer (L0) to the (N/2)th recording layer and the {(N/2)+1}th recording layer to the Nth recording layer each have at least one AB block or more. Further, the settings of the respective layer intervals from the first recording layer (L0) to the (N/2)th recording layer are identical to the settings of the respective layer intervals from the {(N/2)+1}th recording layer to the Nth recording layer.

For example, in the case of 16 layers (M=4, M being the number of kinds of layer intervals), the fourth layer interval D is present between the 8th recording layer (L7) and the 9th recording layer (L8). The first to eighth recording layers (L0) to (L7) and the ninth to sixteenth recording layers (L8) to (L15) each have two AB blocks. Further, the settings of the respective layer intervals from the first recording layer (L0) to the eighth recording layer (L7) are identical to the settings of the respective layer intervals from the ninth recording layer (L8) to the sixteenth recording layer (L15). That is, the layer intervals are set symmetrically with respect to a center between the eighth recording layer (L7) and the ninth recording layer (L8).

The layer interval configuration symmetric with respect to the center between such central recording layers not only can reduce the number of kinds of layer intervals as described above but also facilitate the settings of the layer intervals, which is advantageous for improving efficiency of a manufacturing process. In addition, regularity of the settings of the layer intervals facilitates focus control onto each recording layer in the optical recording media and the operation of a focus jump (interlayer movement) on the side of a recording and reproducing device.

While the layer intervals are set such that A<B<C<D . . . in each of the above examples, the layer intervals are not limited to this. It suffices at least to set A≠B≠C≠D . . . . However, making at least the first layer interval A smallest can minimize a total layer thickness. This is because there are a largest number of spacer layers having the layer interval A.

In addition, as for concrete layer intervals, it suffices to set the smallest first layer interval A to $$12.4 \cdot \lambda / NA / \tan(a\sin(NA/n))$$

using the wavelength λ of reproduction laser light, an NA, and an index n of refraction between layers (the index of refraction is assumed to be the same throughout). This value is described in the document "K. Saito and S. Kobayashi: Proc. SPIE 6282 (2006)." For example, when λ=0.405 um, NA=0.85, and n=1.55, Layer Interval A=9 µm as in the above examples.

In addition, the layer intervals B, C, D, . . . are each separated from the shallower layer interval by a depth of focus ($n\lambda/NA^2$). For example, it suffices to set Layer Interval B=10 μm, Layer Interval C=11 μm, and Layer Interval D=13 μm. Incidentally, it is appropriate to set B+C≠A+D.

[1-2: N-layer ($2^{y-1}$<N<$2^y$) Recording Medium]

The above-described examples are cases where the number of recording layers is a power of two. In the following, description will be made of recording media in which the number N of recording layers is $2^{y-1}$<N<$2^y$. To be short, in cases of $2^{y-1}$<N<$2^y$, it suffices to extract a structure for the number of layers from the $2^y$ constitution.

The following is for cases where the number N of recording layers is $2^{y-1}$<N<$2^y$ (y is an integer of three or more). First, a constitution in which the above-described number of recording layers is $2^y$ is assumed provisionally. That is, a setting is made such that N'=$2^y$, and an Mth layer interval is set between an (N'/2)th recording layer and an {(N'/2)+1}th recording layer for the number M of kinds of layer intervals. A first recording layer to the (N'/2)th recording layer and the {(N'/2)+1}th recording layer to an N'th recording layer each have at least one AB block or more. Further, the settings of respective layer intervals from the first recording layer to the (N'/2)th recording layer are identical to the settings of respective layer intervals from the {(N'/2)+1}th recording layer to the N'th recording layer. This corresponds to the constitutions of 8 layers, 16 layers, 32 layers, and the like described above. At this time, a number N of recording layers are formed with layer interval settings in a case where N consecutive recording layers are extracted from the first to N'th recording layers in the assumption in question.

To be short with a concrete example, when a 20-layer recording medium is formed, for example, it suffices to extract 20 layers from the constitution of the 32-layer recording medium in FIG. 6.

Figure 7:
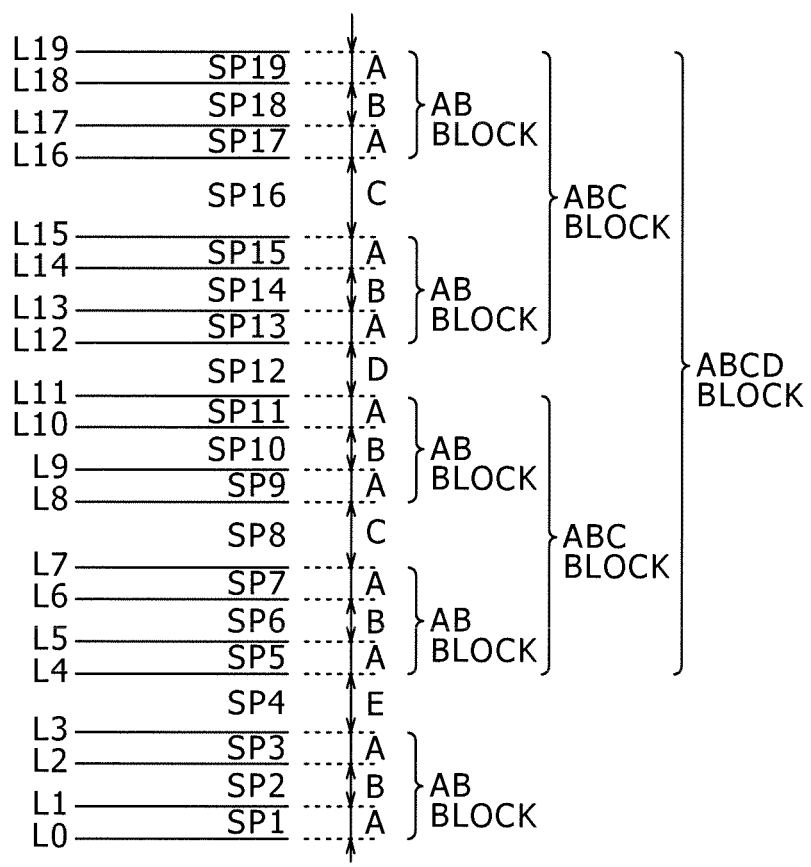
FIG. 7 is a diagram of assistance in explaining a 20-layer recording medium according to the first embodiment.
Figure 8:
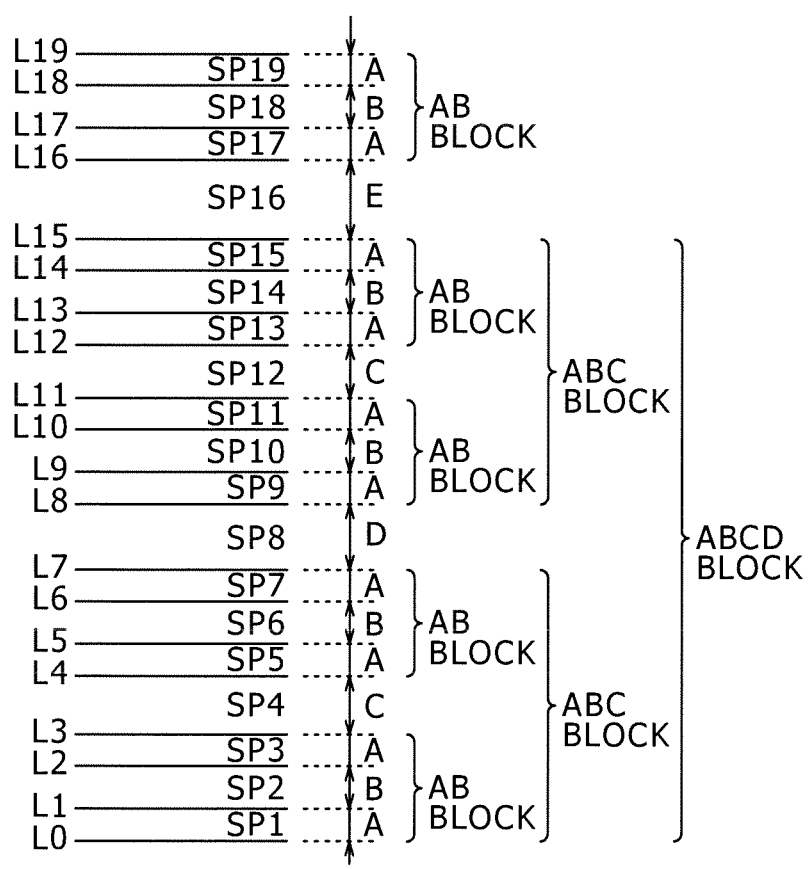
FIG. 8 is a diagram of assistance in explaining a 20-layer recording medium according to the first embodiment.
Figure 9:
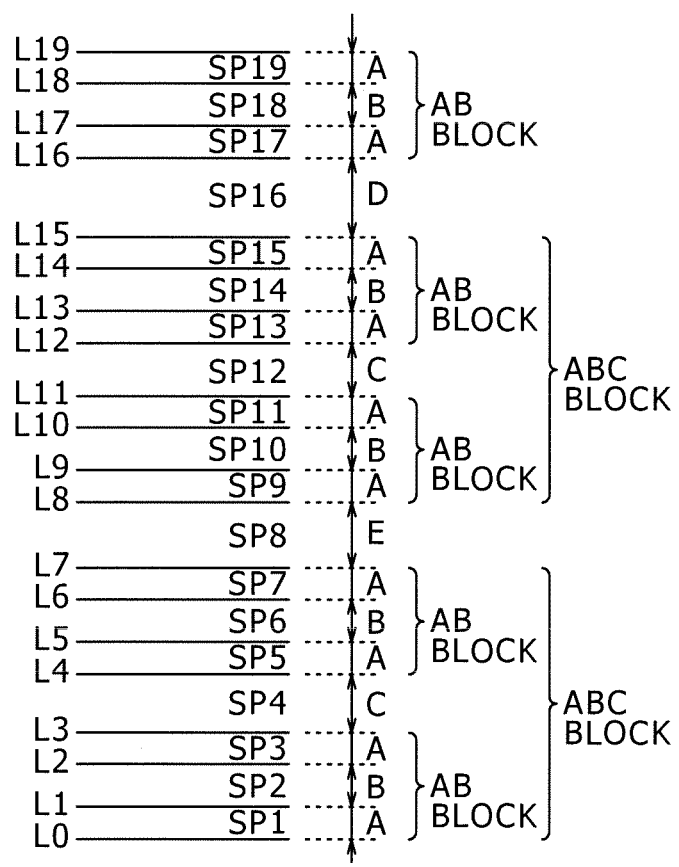
FIG. 9 is a diagram of assistance in explaining a 20-layer recording medium according to the first embodiment.

FIG. 7, FIG. 8, and FIG. 9 each show an example of an interlayer structure of a 20-layer recording medium. FIG. 7 represents an example of a 20-layer recording medium in which the recording layers L12 to L31 in the 32-layer recording medium of FIG. 6 are set as recording layers L0 to L19. FIG. 8 represents an example of a 20-layer recording medium in which the recording layers L0 to L19 in the 32-layer recording medium of FIG. 6 are set as recording layers L0 to L19. FIG. 7 represents an example of a 20-layer recording medium in which the recording layers L8 to L27 in the 32-layer recording medium of FIG. 6 are set as recording layers L0 to L19.

As described above, in the 32-layer recording medium, for example, layer intervals are set such that at a time of reproduction of each recording layer, stray light components reflected by recording layers on a side nearer to a laser incidence surface than the recording layer are not focused on certain recording layers. Therefore, even when any arbitrary set of 20 layers is extracted from the constitution of the 32-layer recording medium in which each layer interval is set as described above, stray light components at a time of reproduction are not focused on certain recording layers. Hence, in a case of forming a 20-layer recording medium, for example, when each layer interval is set as a constitution extracted from the example of the 32-layer constitution as in the example of FIG. 7, FIG. 8, or FIG. 9, an optical recording medium reducing the effect of crosstalk can be realized, and the number of kinds of layer intervals can be minimized.

Figure 10:
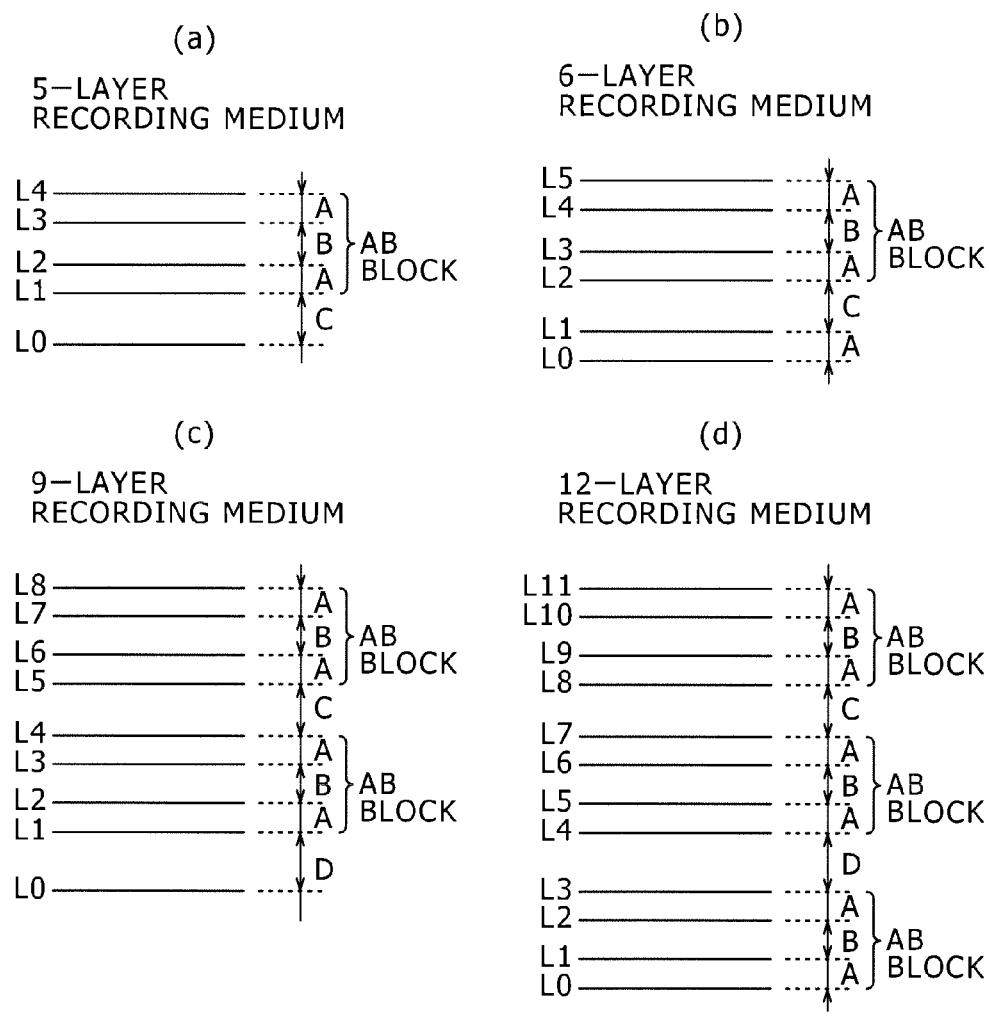
FIG. 10 is a diagram of assistance in explaining a 5-layer recording medium, a 6-layer recording medium, a 9-layer recording medium, and a 12-layer recording medium according to the first embodiment.

FIG. 10 shows other examples. A case of a five-layer recording medium is as shown in FIG. 10(*a*). Specifically, the recording layers L3 to L7 in the eight-layer recording medium of FIG. 3 are set as recording layers L0 to L4. In a case of a six-layer recording medium, as shown in FIG. 10(*b*), for example, the recording layers L2 to L7 in the eight-layer recording medium of FIG. 3 are set as recording layers L0 to L5. In a case of a nine-layer recording medium, as shown in FIG. 10(*c*), the recording layers L7 to L15 in the 16-layer recording medium of FIG. 5 are set as recording layers L0 to L8. In a case of a 12-layer recording medium, as in FIG. 10(*d*), for example, the recording layers L4 to L15 in the 16-layer recording medium of FIG. 5 are set as recording layers L0 to L11.

Similar settings are made in cases of other numbers of layers. There are of course constitutions other than the above illustrations. For example, in a case of a five-layer recording medium, the recording layers L0 to L4 in the eight-layer recording medium of FIG. 3 may be set as recording layers L0 to L4.

With such constitutions, even when the number N of recording layers is $2^{y-1}$<N<$2^y$ (y is an integer of three or more), recording media effective in reducing an interlayer crosstalk with a minimum of kinds of layer intervals can be realized as in the above-described cases where the number of recording layers is $2^y$. Effects including an improvement in efficiency of a manufacturing process and the like are thereby obtained.

<2. Second Embodiment: Recording Device for Bulk Type Optical Recording Medium>

[2-1: Structure of Optical Recording Medium]

A recording device for a bulk type optical recording medium will next be described as a second embodiment. A bulk type optical recording medium does not have recording layers formed therein in advance, but recording layers are formed in the bulk type optical recording medium for the first time by performing information recording by a recording device. Hence, the position of a recording layer is determined by setting a focus position at a time of recording in the recording device. Thus, when an interlayer crosstalk at a time of reproduction is taken into consideration, the recording device needs to set the position of the recording layer (layer intervals) properly.

Figure 11:
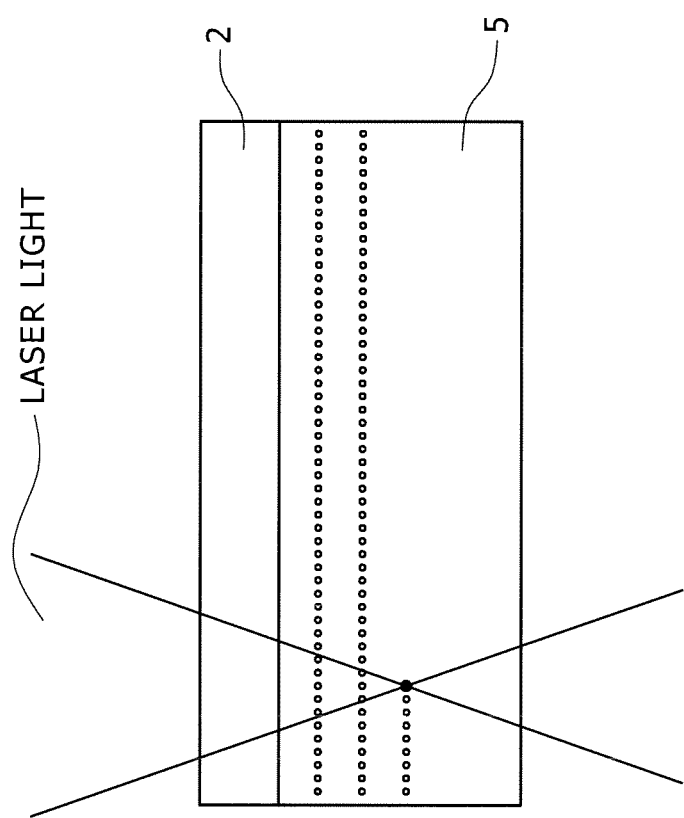
FIG. 11 is a diagram of assistance in explaining microhologram recording.

A bulk recording type optical recording medium will first be described. Bulk recording is a technique for achieving a high recording capacity by irradiating an optical recording medium having at least a cover layer 2 and a bulk layer 5 as shown in FIG. 11, for example, with laser light while changing a focal position sequentially, and thereby performing multilayer recording within the bulk layer 5.

In relation to such bulk recording, a recording technique referred to as a so-called microholographic system is known. The microholographic system uses a so-called holographic recording material as a recording material for the bulk layer 5. A photopolymerizable photopolymer, for example, is widely known as a holographic recording material.

Figure 12:
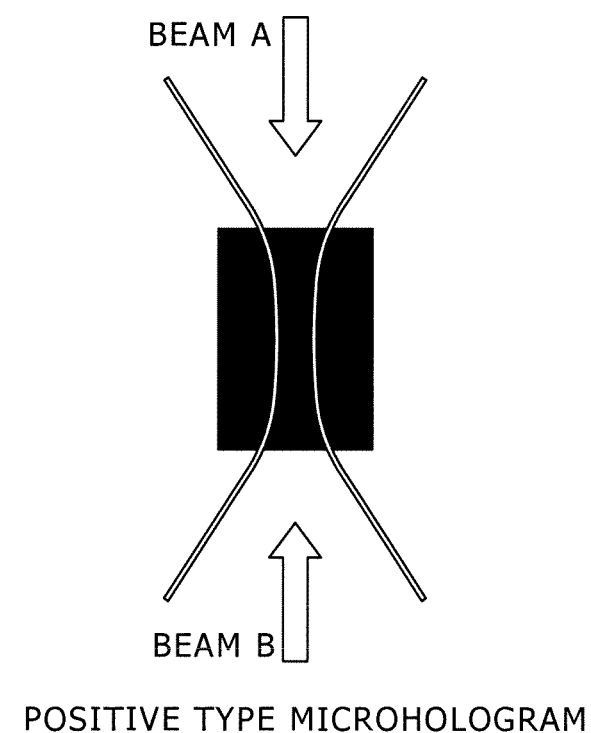
FIG. 12 is a diagram of assistance in explaining microhologram recording.

As shown in FIG. 12, the microholographic system is a method of forming minute interference fringes (hologram) by condensing two beams opposed to each other (a beam A and a beam B) at a same position and setting this as a recorded mark.

Further, the present applicant has proposed a void recording (hole recording) system as another method for bulk recording. The void recording system is a method of irradiating a bulk layer 5 formed of a recording material such for example as a photopolymerizable photopolymer with laser light at a relatively high power, and thereby recording holes (voids) within the bulk layer 5.

The thus formed void parts have a different index of refraction from other parts within the bulk layer 5, and the reflectance of light is increased at boundary parts between these parts. Hence, the above void parts function as recorded marks. Thereby information recording by the formation of void marks is realized.

Such a void recording system does not form a hologram, and thus needs only light irradiation from one side in recording. Specifically, a need to form recorded marks by condensing two beams at a same position as in the case of the positive type microholographic system can be eliminated, and a need for high position control accuracy for condensing two beams at a same position can be obviated.

In the following, an optical recording medium used for the void recording system that performs light irradiation from one side at a time of recording will be taken as an example. However, the present embodiment to be described in the following is not necessarily applicable only to the void recording system, but is applicable to systems that perform information recording in a bulk layer.

Figure 13:
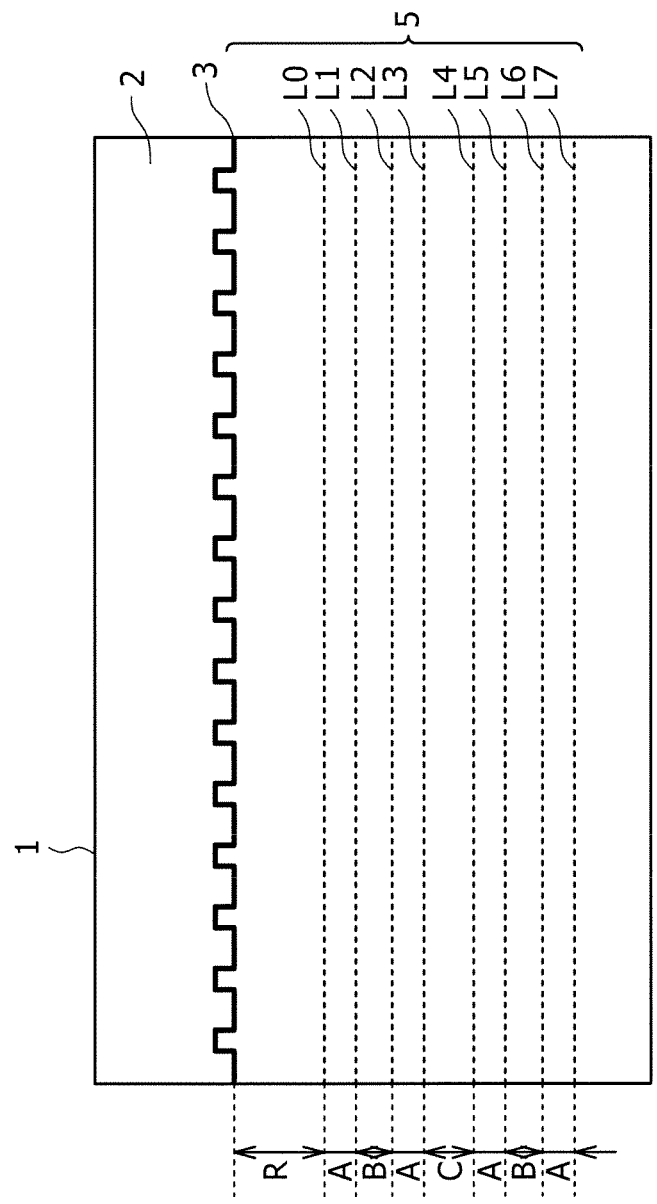
FIG. 13 is a diagram of assistance in explaining a bulk recording medium according to a second embodiment of the present invention.

FIG. 13 is a sectional structural view of a bulk recording medium 1 in which recording is performed by a recording device according to the second embodiment. The bulk recording medium 1 shown in FIG. 13 is an optical recording medium having the shape of a disk. Mark recording (information recording) is performed by irradiating the bulk recording medium 1 being rotation-driven with laser light. In addition, recorded information is reproduced by irradiating the bulk recording medium 1 being rotation-driven with laser light.

In FIG. 13, the bulk recording medium 1 has a cover layer 2, a reference plane 3, and a bulk layer 5 formed in order in a direction of thickness from an upper layer side (side of a laser incidence surface) as shown in the figure. Incidentally, words such as the "direction of thickness" and a "direction of depth" are used in the description of the present example. The "direction of thickness" and the "direction of depth" refer to the direction of thickness of the bulk recording medium 1 as a direction parallel with a direction of incidence of laser light.

In the bulk recording medium 1, the cover layer 2 is formed of a resin such as polycarbonate or acrylic and the reference plane 3 is formed on the lower surface side of the cover layer 2 as shown in the figure. The reference plane 3 is given a sectional shape of depressions and projections attendant on the formation of a guiding groove for guiding a recording/reproduction position. As viewed in a direction of a flat surface of the disk, the guiding groove is formed in a spiral shape. A continuous groove (groove) or a pit string is formed as the above guiding groove. When the guiding groove is a groove, for example, the groove is formed in a state of being periodically meandered (wobbling), so that address information can be recorded by the periodic information of the meander. Description in the following will be made supposing that the reference plane 3 is formed as a continuous groove (wobbling groove) having address information recorded therein.

The cover layer 2 is formed by injection molding or the like using a stamper on which a shape of depressions and projections as such a meandering guiding groove (wobbling groove) is formed. Thereby the shape of depressions and projections is transferred to the lower surface side of the cover layer 2. The reference plane 3 is formed by forming a selective reflecting film on the surface in the depression and projection shape of the cover layer 2.

In this case, the recording system for the bulk recording medium 1 applies servo light (hereinafter second laser light) for obtaining a tracking error signal and a focus error signal on the basis of the above-described reference plane 3 separately from recording light (hereinafter first laser light) for mark recording in the bulk layer 5. At this time, if the second laser light reaches the bulk layer 5, the mark recording within the bulk layer 5 may be adversely affected. Therefore, a reflective film having selectivity to reflect the second laser light and transmit the first laser light is necessary. In the present example, the first laser light and the second laser light have respective different wavelengths, such for example as a wavelength of 405 nm of the first laser light and a wavelength of 660 nm of the second laser light. In order to make provision for this, a selective reflecting film having wavelength selectivity to reflect light in the same wavelength range as the second laser light and transmit light of other wavelengths is used as the above selective reflecting film.

The bulk layer 5 is formed on the lower layer side of the reference plane 3 (deeper side as viewed from the side of the laser incidence surface). It suffices to use an appropriate material as a material for forming the bulk layer 5 (recording material) according to the recording system such as the microholographic system or the void recording system. For example, in the case of the void recording system, a plastic material is used.

In the bulk layer 5, information recording by mark formation is performed by sequentially focusing laser light on each position determined in advance in a direction of depth of the bulk layer 5. Hence, the bulk recording medium 1 that has been recorded has a plurality of recording layers L formed within the bulk layer 5. In the example of the figure, as shown as recording layers L0 to L7, eight recording layers are formed. The thickness size and the like of the bulk layer 5 are not determined. However, when a case of applying blue laser light (wavelength of 405 nm) with an optical system having an NA of 0.85, for example, it is appropriate to form recording layers at positions of 50 μm to 300 μm from the surface of the disk (surface of the cover layer 2) in the direction of depth. This range is given with spherical aberration correction taken into account.

In addition, marks are recorded in each recording layer L in a state of tracking servo control being attained by using the groove formed in the reference plane 3. Hence, a mark string formed in the recording layer L is formed in a spiral shape as viewed in the direction of a flat surface of the disk.

In this case, in the example of FIG. 13, depth positions at which the recording layers L0 to L7 are formed are indicated by broken lines. As described above, information recording by mark formation is performed by sequentially focusing laser light on each position determined in advance in the direction of depth of the bulk layer 5. As a result, a recording layer is formed.

"Each position determined in advance" in this case is each position determined according to a layer interval configuration as described in the foregoing first embodiment. Thereby recording layer positions determined with crosstalk taken into consideration are realized.

In the case of FIG. 13, for example, eight layers are taken as an example, which has three kinds of layer intervals, that is, a first layer interval A, a second layer interval B, and a third layer interval C. Then, a layer interval configuration is as follows:

| | |
|---|---|
| L0-L1 Layer Interval | A |
| L1-L2 Layer Interval | B |
| L2-L3 Layer Interval | A |
| L3-L4 Layer Interval | C |
| L4-L5 Layer Interval | A |
| L5-L6 Layer Interval | B |
| L6-L7 Layer Interval | A |

That is, a layer interval configuration similar to that of the eight-layer recording medium of FIG. 3 is formed. Incidentally, an interval from the reference plane 3 to the recording layer L0 is set as R.

[2-2: Servo Control]

Servo control at a time of recording/reproduction on the bulk recording medium 1 will be described with reference to FIG. 14. As described above, the bulk recording medium 1 is irradiated with first laser light for forming recorded marks and reproducing information from the recorded marks and second laser light of a different wavelength from that of the first laser light.

As will be described later with reference to FIG. 15, the bulk recording medium 1 is irradiated with the first laser light and the second laser light via a common objective lens (an objective lens 21 in FIG. 15).

In this case, as shown in FIG. 13, the bulk layer 5 in the bulk recording medium 1 does not include a reflecting surface having a guiding groove formed by pits, a groove, or the like in each layer position as an object of recording, unlike multilayer disks in relation to current optical disks such for example as DVDs and Blu-ray Discs. Therefore, at a time of recording when no marks are formed yet, a focus servo and a tracking servo for the first laser light cannot be performed using the reflected light of the first laser light itself. Thus, at a time of recording on the bulk recording medium 1, the tracking servo and the focus servo for the first laser light are both performed using the reflected light of the second laser light as servo light.

Figure 15:
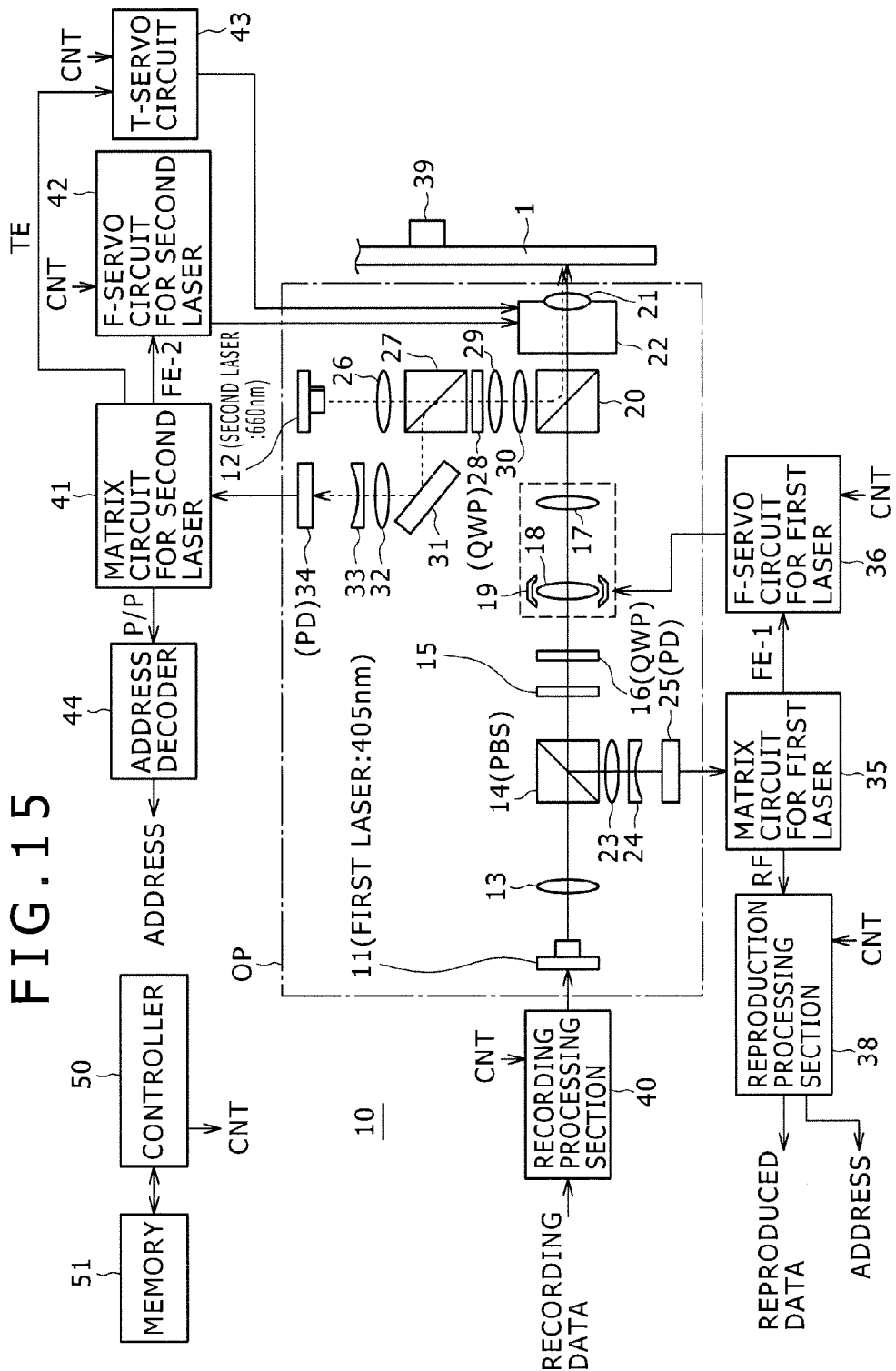
FIG. 15 is a diagram of assistance in explaining a recording and reproducing optical system according to the second embodiment.

Specifically, first, a focus mechanism for the first laser light which mechanism can change only the in-focus position of the first laser light independently (an expander formed by lenses 17 and 18 and a lens driving part 19 in FIG. 15) is provided for the focus servo for the first laser light at a time of recording. Then, the focus servo for the first laser light is performed by controlling the focus mechanism (expander) for the first laser light on the basis of an offset of as shown in FIG. 2 with the reference plane 3 as a reference.

In this case, as described above, the first laser light and the second laser light are applied to the recording medium 1 via the common objective lens. Then, the focus servo for the second laser light is performed by controlling the objective lens using the reflected light (return light) of the second laser light from the reference plane 3. When the first laser light and the second laser light are thus applied via the common objective lens, and the focus servo for the second laser light is performed by controlling the objective lens on the basis of the reflected light of the second laser light from the reference plane 3, the in-focus position of the first laser light basically follows on the reference plane 3. That is, in other words, such a focus servo for the objective lens on the basis of the reflected light of the second laser light from the reference plane 3 provides a function of following surface variations of the bulk recording medium 1 for the in-focus position of the first laser light. Then, the focus mechanism for the first laser light as described above offsets the in-focus position of the first laser light by the value of the above offset of. The in-focus position of the first laser light can be thereby made to follow a required depth position within the bulk layer 5.

Figure 14:
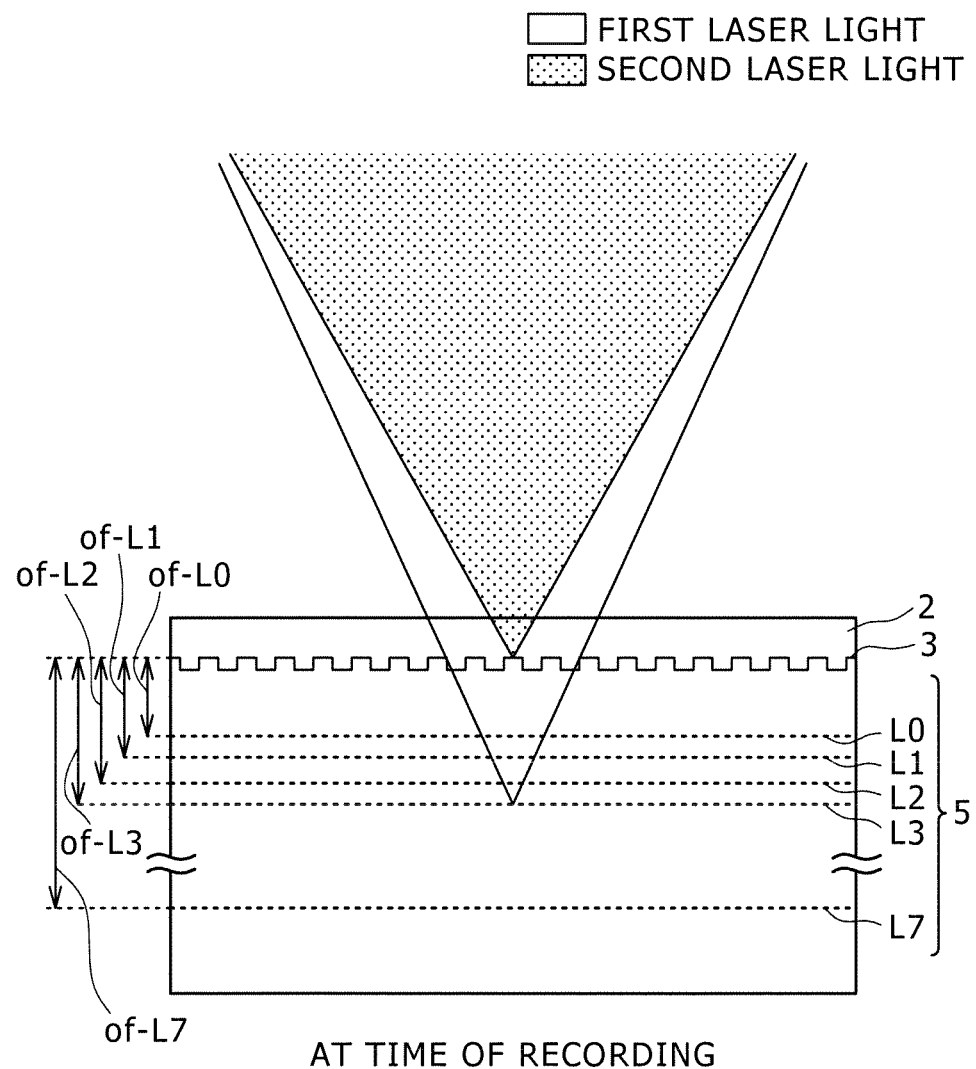
FIG. 14 is a diagram of assistance in explaining servo control at a time of recording according to the second embodiment.

FIG. 14 shows an example of each offset of corresponding to a case where information recording layers L0 to L7 are set in the bulk layer 5. Specifically, a case of setting an offset of-L0 corresponding to the layer position of the recording layer L0, an offset of-L1 corresponding to the layer position of the recording layer L1, . . . , and an offset of-L7 corresponding to the layer position of the recording layer L7 is shown. When the focus mechanism for the first laser is driven using the values of these offsets of, a position of formation of marks (recording position) in the direction of depth can be selected properly among the layer positions of the recording layers L0 to L7.

In addition, a tracking servo for the first laser light at a time of recording is realized by performing a tracking servo for the objective lens using the reflected light of the second laser light from the reference plane 3 utilizing the fact that the first laser light and the second laser light are applied via the common objective lens as described above. Further, address information is obtained at a time of recording from the reflected light information of the second laser light from the reference plane 3 utilizing the fact that a wobbling groove having address information recorded therein is formed in the reference plane 3.

On the other hand, at a time of reproduction, the recording layers L are formed in the bulk layer 5 as shown in FIG. 13, and therefore the reflected light of the first laser light from such recording layers L can be obtained. Thus, the focus servo for the first laser light at a time of reproduction is performed using the reflected light of the first laser light itself. Specifically, the focus servo for the first laser light at a time of reproduction is performed by controlling the above-described focus mechanism for the first laser light on the basis of the reflected light of the first laser light. Incidentally, the tracking servo for the first laser light at a time of reproduction is also realized by performing the tracking servo for the objective lens on the basis of the reflected light of the second laser light.

In this case, also at a time of reproduction, a focus servo and a tracking servo for the second laser light targeted at the reference plane 3 are performed to read the address information recorded in the reference plane 3. That is, also at a time of reproduction, as at a time of recording, the position of the objective lens is controlled by realizing the focus servo and the tracking servo for the second laser light targeted at the reference plane 3 on the basis of the reflected light of the second laser light.

Summarizing the above, servo control is performed as follows.

First Laser Light Side

At a time of recording, the focus servo is performed by driving the common objective lens using the reflected light of the second laser light and giving an offset using the focus mechanism (expander) for the first laser light. The tracking servo is performed automatically because the objective lens is driven using the reflected light of the second laser light. At a time of reproduction, the focus servo is performed by driving the focus mechanism (expander) for the first laser light using the reflected light of the first laser light. The tracking servo for the first laser light at a time of reproduction is also performed automatically because the objective lens is driven using the reflected light of the second laser light.

Second Laser Light Side

Both at a time of recording and at a time of reproduction, the focus servo and the tracking servo are performed by driving the objective lens using the reflected light of the second laser light.

Incidentally, at a time of reproduction, it is possible not to use the second laser light after completing access to a predetermined address and actually starting reproducing a recording layer L. That is, after a recorded mark string is formed, the focus servo and the tracking servo for the objective lens can be performed on the basis of reflected light of the first laser light from the recording layer L, and addresses included in the data recorded in the recorded mark string can be read.

[2-3: Recording and Reproducing Optical System]

FIG. 15 shows a configuration of a recording and reproducing device 10 for performing recording and reproduction on the bulk recording medium 1 of FIG. 13. The bulk recording medium 1 loaded in the recording and reproducing device 10 is rotation-driven by a spindle motor 39 in the figure. Then, the recording and reproducing device 10 has an optical pickup OP for irradiating the thus rotation-driven recording medium 1 with first laser light and second laser light.

The optical pickup OP includes a first laser diode 11 as a light source of the first laser light for recording information by forming recorded marks and reproducing the information recorded by the recorded marks and a second laser diode 12 as a light source of the second laser light as servo light. In this case, the first laser light and the second laser light have respective different wavelengths, as described above. In the present example, the first laser light has a wavelength of about 405 nm (so-called blue-violet laser light), and the second laser light has a wavelength of about 660 nm (red laser light).

The optical pickup OP also includes an objective lens 21 as a terminal for the output of the first laser light and the second laser light to the recording medium 1. The objective lens 21 has an NA of 0.85. Further, a first photodetector 25 for receiving the reflected light of the first laser light from the bulk recording medium 1 and a second photodetector 34 for receiving the reflected light of the second laser light from the bulk recording medium 1 are provided.

An optical system for guiding the first laser light emitted from the first laser diode 11 to the objective lens 21 and guiding the reflected light of the first laser light from the bulk recording medium 1 which reflected light enters the objective lens 21 to the first photodetector 25 is formed within the optical pickup OP. The path of the first laser light is indicated by a solid line. The first laser light emitted from the first laser diode 11 is first converted into collimated light via a collimator 13, and then enters a polarization beam splitter 14. The polarization beam splitter 14 is formed so as to transmit the first laser light made incident via the collimator 13.

The first laser light transmitted by the polarization beam splitter 14 passes through a liquid crystal element 15 and a quarter-wave plate 16. The liquid crystal element 15 is provided to correct so-called off-axis aberration such for example as comatic aberration and astigmatism.

The first laser light that has passed through the quarter-wave plate 16 enters an expander composed of lenses 17 and 18 and a lens driving part 19. This expander has a fixed lens as the lens 17 and has a movable lens as the lens 18. The lens driving part 19 drives the lens 18 in a direction parallel with the optical axis of the first laser light. Thereby independent focus control is performed on the first laser light. The expander (lens driving part 19) offsets the in-focus position of the first laser light on the basis of an instruction from a controller 50 at a time of recording, and performs focus control on the first laser light on the basis of an output signal from a focus servo circuit 36 for the first laser at a time of reproduction.

The first laser light passed through the expander enters a dichroic mirror 20. The dichroic mirror 20 is formed so as to transmit light in the same wavelength range as the first laser light and reflect light of other wavelengths. Hence, the first laser light made incident through the expander passes through the dichroic mirror 20.

The first laser light that has passed through the dichroic mirror 20 is applied to the recording medium 1 via the objective lens 21. The objective lens 21 is provided with an actuator 22 for retaining the objective lens 21 so as to be able to displace the objective lens 21 in a focus direction (direction of approaching and separating from the bulk recording medium 1) and a tracking direction (direction orthogonal to the focus direction: the direction of the radius of the bulk recording medium 1). The actuator 22 has a focus coil and a tracking coil supplied with driving currents from a focus servo circuit 42 for the second laser and a tracking servo circuit 43, respectively. The actuator 22 thereby displaces the objective lens 21 in each of the focus direction and the tracking direction.

At a time of reproduction, according to the irradiation of the bulk recording medium 1 with the first laser light as described above, the reflected light of the first laser light is obtained from the bulk recording medium 1 (particularly a recording layer L as an object of reproduction within the bulk layer 5). The thus obtained reflected light of the first laser light is guided to the dichroic mirror 20 via the objective lens 21, and transmitted by the dichroic mirror 20. The reflected light of the first laser light which reflected light has passed through the dichroic mirror 20 is passed through the lens 17 and the lens 18 forming the expander, and thereafter enters the polarization beam splitter 14 via the quarter-wave plate 16 and the liquid crystal element 15.

In this case, due to the action of the quarter-wave plate 16 and the action of the reflection by the bulk recording medium 1, the reflected light (return light) of the first laser light which reflected light thus enters the polarization beam splitter 14 is different in polarization direction by 90 degrees from the first laser light (outward light) that entered the polarization beam splitter 14 from the side of the first laser diode 11. As a result, the reflected light of the first laser light which reflected light entered as described above is reflected by the polarization beam splitter 14.

The reflected light of the first laser light which reflected light is reflected by the polarization beam splitter 14 is guided to the side of a condensing lens 23 in the figure. Then, the reflected light is condensed on the detecting surface of the first photodetector 25 via the condensing lens 23 and a cylindrical lens 24.

In addition, an optical system for guiding the second laser light emitted from the second laser diode 12 to the objective lens 21 and guiding the reflected light of the second laser light from the bulk recording medium 1 which reflected light enters the objective lens 21 to the second photodetector 34 is formed within the optical pickup OP. The path of the second laser light is indicated by a broken line. As shown in the figure, the second laser light emitted from the second laser diode 12 is converted into collimated light by a collimator 26, and then enters a polarization beam splitter 27. The polarization beam splitter 27 is formed so as to transmit the second laser light (outward light) made incident via the collimator 26.

The second laser light transmitted by the polarization beam splitter 27 enters the dichroic mirror 20 via a quarter-wave plate 28 and lenses 29 and 30. As described above, the dichroic mirror 20 is formed so as to transmit light in the same wavelength range as the first laser light and reflect light of other wavelengths. Hence, the second laser light is reflected by the dichroic mirror 20, and applied to the bulk recording medium 1 via the objective lens 21 as shown in the figure.

In addition, the reflected light of the second laser light (reflected light from the reference plane 3) which reflected light is obtained according to such irradiation of the bulk recording medium 1 with the second laser light passes through the objective lens 21, is reflected by the dichroic mirror 20, passes through the lenses 30 and 29 and the quarter-wave plate 28, and thereafter enters the polarization beam splitter 27. As in the case of the above first laser light, due to the action of the quarter-wave plate 28 and the action of the reflection by the bulk recording medium 1, the reflected light (return light) of the second laser light which reflected light enters from the side of the bulk recording medium 1 is different in polarization direction by 90 degrees from the outward light. Hence, the reflected light of the second laser light as the return light is reflected by the polarization beam splitter 27. Then, the reflected light of the second laser light which reflected light is reflected is reflected by a mirror 31, and condensed on the detecting surface of the second photodetector 34 via a condensing lens 29 and a cylindrical lens 33.

Though not shown, the recording and reproducing device 10 has a slide driving section for slide-driving the whole of the optical pickup OP in the tracking direction. By driving the optical pickup OP, the slide driving section can displace a laser light irradiation position over a wide range.

The recording and reproducing device 10 also includes a recording processing section 40, a matrix circuit 35 for the first laser, a focus servo circuit 36 for the first laser, a reproduction processing section 38, a matrix circuit 41 for the second laser, a focus servo circuit 42 for the second laser, a tracking servo circuit 43, an address decoder 44, and a controller 50.

First, data to be recorded on the bulk recording medium 1 (recording data) is input to the recording processing section 40. The recording processing section 40 adds an error correcting code to the input recording data and applies predetermined recording modulation coding to the input recording data. The recording processing section 40 thereby obtains a recording modulated data string as a binary data string of "0s" and "1s" to be actually recorded on the bulk recording medium 1. Further, a write strategy is performed on the basis of the recording modulated data string, and a laser driving signal is generated. Then, the laser driving signal is supplied to the first laser diode 11 to drive the first laser diode 11 for light emission. The recording processing section 40 performs such processing according to an instruction (control signal CNT) from the controller 50.

The matrix circuit 35 for the first laser includes a current-to-voltage converting circuit, a matrix operation/amplifying circuit, and the like so as to correspond to output currents from a plurality of light receiving elements as the first photodetector 25. The matrix circuit 35 for the first laser generates a necessary signal by matrix operation processing. Specifically, a high-frequency signal (reproduced signal RF) corresponding to a reproduced signal, a focus error signal FE for focus servo control, and the like are generated. In the present example, there are two kinds of focus error signals FE based on the reflected light of the first laser light and based on the reflected light of the second laser light. In order to distinguish the two kinds of focus error signals FE from each other, the focus error signal FE generated in the matrix circuit 32 for the first laser will hereinafter be referred to as a focus error signal FE-1.

The reproduced signal RF generated in the matrix circuit 35 for the first laser is supplied to the reproduction processing section 38. In addition, the focus error signal FE-1 is supplied to the focus servo circuit 37 for the first laser.

The reproduction processing section 38 subjects the reproduced signal RF generated in the matrix circuit 35 for the first laser to reproduction processing for reconstructing the recorded data described above, such as binarization processing, decoding for recording modulation code, and error correction processing, and obtains reproduced data as a result of reproducing the recorded data. In addition, at a time of reproduction, address information is extracted from the reproduced data. The address information is supplied to the controller 50.

In addition, the focus servo circuit 36 for the first laser generates a focus servo signal based on the focus error signal FE-1, and driving-controls the lens driving part 19 on the basis of the focus servo signal. The focus servo circuit 36 for the first laser thereby performs focus servo control for the first laser light. At a time of recording, the focus servo circuit 36 for the first laser drives the lens driving part 19 on the basis of a predetermined offset of (see FIG. 14) according to an instruction (control signal CNT) given from the controller 50. In addition, at a time of reproduction, the focus servo circuit 36 for the first laser performs focus servo control for the first laser light by driving the lens driving part 19 on the basis of the reflected light of the first laser light. Further, according to an instruction (control signal CNT) given from the controller 50 at a time of reproduction, the focus servo circuit 36 for the first laser driving-controls the lens driving part 19 such that interlayer jump operation between recording layers L formed in the bulk recording medium 1 and a focus servo pull-in to a required information recording surface L are performed.

Meanwhile, as for the side of the second laser light, the matrix circuit 41 for the second laser includes a current-to-voltage converting circuit, a matrix operation/amplifying circuit, and the like so as to correspond to output currents from a plurality of light receiving elements as the second photodetector 34. The matrix circuit 41 for the second laser generates a necessary signal by matrix operation processing. Specifically, the matrix circuit 41 for the second laser generates a focus error signal FE-2 and a tracking error signal TE for servo control and a push-pull signal P/P for address extraction. The focus error signal FE-2 is supplied to the focus servo circuit 42 for the second laser. In addition, the tracking error signal TE is supplied to the tracking servo circuit 43. The push-pull signal P/P is supplied to the address decoder 44.

The focus servo circuit 42 for the second laser generates a focus servo signal based on the focus error signal FE-2, and drives the focus coil of the actuator 22 on the basis of the focus servo signal. The focus servo circuit 42 for the second laser thereby performs focus servo control on the objective lens 21. As described earlier, the focus servo control on the objective lens 21 is performed on the basis of the reflected light of the second laser light both at a time of recording and at a time of reproduction. The focus servo circuit 42 for the second laser drives the focus coil according to a control signal CNT from the controller 50 such that a focus servo pull-in to the reference plane 3 formed in the bulk recording medium 1 is performed. Incidentally, an astigmatism method, an SSD (Spot Size Detection) method, a differential astigmatism method, or the like can be used for the focus servo control.

The tracking servo circuit 43 generates a tracking servo signal based on the tracking error signal TE from the matrix circuit 41 for the second laser, and drives the tracking coil of the actuator 22 on the basis of the tracking servo signal. As described above, tracking servo control on the objective lens 21 is performed on the basis of the reflected light of the second laser light both at a time of recording and at a time of reproduction. Incidentally, a PP (Push-Pull) method, a DPP (Differential Push-Pull) method, or the like can be used for the tracking servo control.

The address decoder 44 decodes address information from the input push-pull signal P/P. Because the second laser light is focused on the reference plane 3, the reflected light of the second laser light has the information of the wobbling groove formed in the reference plane 3. The matrix circuit 41 for the second laser supplies the address decoder 44 with the information of the wobbling groove as the push-pull signal P/P. The address decoder 44 decodes the address information from the push-pull signal P/P, and supplies the address information to the controller 50.

The controller 50 is formed by a microcomputer including a CPU (Central Processing Unit), for example. A memory section 51 includes a RAM, a ROM, a flash memory, and the like. The memory section 51 represents areas for storing information used for various kinds of processing by the controller 50. The controller 50 performs processing according to a program stored in the memory section 51, for example. Then, control signals CNT are supplied to various required parts to perform overall control of the recording and reproducing device 10. At a time of recording, the controller 50 controls the in-focus position of the first laser light (selects a recording position in the direction of depth) on the basis of the value of the offset of set so as to correspond to each layer position as described with reference to FIG. 14. That is, the controller 50 selects a recording position in the direction of depth by instructing the focus servo circuit 36 for the first laser to drive the lens driving part 19 on the basis of the value of an offset of set so as to correspond to a layer position as an object of recording. The value of the offset of is stored in the ROM, the flash memory, or the like within the memory section 51. The positions of the respective recording layers L0 to L(n) in the bulk recording medium 1 are set by setting the values of the offsets of-L0 to of-L(n).

As described above, tracking servo control at a time of recording is performed on the basis of the reflected light of the second laser light. Therefore the controller 50 at the time of recording instructs the tracking servo circuit 43 to perform tracking servo control based on the tracking error signal TE. In addition, the controller 50 at the time of recording instructs the focus servo circuit 42 for the second laser to perform focus servo control based on the focus error signal FE-2 (focus servo control on the objective lens 21).

On the other hand, at a time of reproduction, the controller 50 instructs the focus servo circuit 36 for the first laser to focus the first laser light on a recording layer L in which data to be reproduced is recorded. That is, focus servo control targeted at the recording layer L is made to be performed for the first laser light. In addition, the controller 50 at the time of reproduction also makes the tracking servo circuit 43 perform tracking servo control based on the tracking error signal TE. In addition, the controller 50 at the time of reproduction makes the focus servo circuit 42 for the second laser perform focus servo control based on the focus error signal FE-2 (focus servo control on the objective lens 21).

[2-4: Recording Process]

Figure 16:
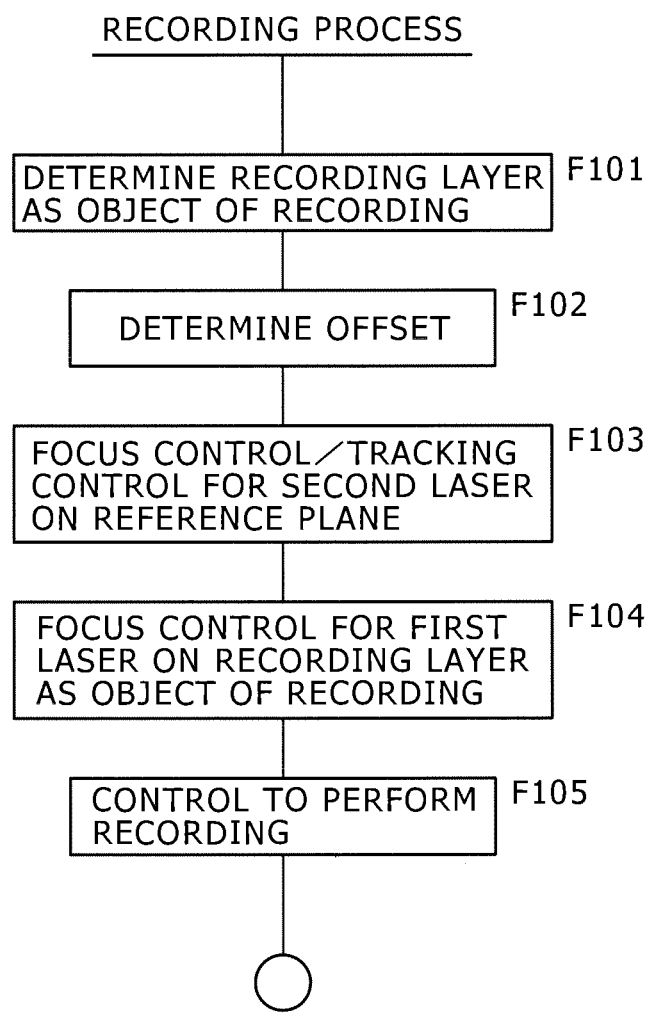
FIG. 16 is a flowchart of a recording process according to the second embodiment.

FIG. 16 shows a process at a time of recording by such a recording and reproducing device 10. In step F101, the controller 50 determines a recording layer as an object of recording. In the case of eight layers as in FIG. 13, for example, one recording layer among the recording layers L0 to L7 is selected.

Next, in step F102, the controller 50 determines an offset value of-L(x) corresponding to the recording layer L(x) in which to perform recording. When the values of the offsets of-L0 to of-L(7) are stored in the memory section 51 as described above, for example, an offset value corresponding to the target recording layer is read.

In step F103, the controller 50 makes focus control and tracking control performed for the second laser light on the reference plane 3. Specifically, the focus servo circuit 42 for the second laser is instructed to drive the actuator 22 to position the objective lens 21 such that the in-focus position of the second laser light is on the reference plane 3. Further, after the focus control, the tracking servo by the tracking servo circuit 43 is turned on so that tracking control is performed.

After performing the focus and tracking control by the second laser light, the controller 50 in next step F104 focus-controls the first laser light onto the recording layer as an object of recording. Specifically, the offset value of-L(x) determined in step F102 is given to the focus servo circuit 36 for the first laser to drive the expander (lens driving part 19). Thereby, the first laser light is focused at a depth position at which to form the recording layer L(x) set as an object of recording this time. In this state, recording operation is started in step F105. Specifically, a laser driving signal based on recording data is output from the recording processing section 40, and the first laser light modulated by the recording data as recording power is output from the first laser diode. Thereby recording on the recording layer L(x) (and the formation of the recording layer) is performed.

In this case, the above-described offset values are set as follows. Incidentally, "R" is a distance from the reference plane 3 to the recording layer L0 as shown in FIG. 13.

| | |
|---|---|
| offset value of-L0 | R |
| offset value of-L1 | R + A |
| offset value of-L2 | R + A + B |
| offset value of-L3 | R + A + B + A |
| offset value of-L4 | R + A + B + A + C |
| offset value of-L5 | R + A + B + A + C + A |
| offset value of-L6 | R + A + B + A + C + A + B |
| offset value of-L7 | R + A + B + A + C + A + B + A |

With such settings, the recording layers L0 to L7 are formed at layer intervals as in FIG. 13 as an eight-layer recording medium, for example. That is, the bulk recording medium of a similar layer interval configuration to that of FIG. 3 described in the first embodiment is formed by the recording operation. Then, it is needless to say that stray light is not focused on a certain recording layer at a time of reproduction on such a bulk recording medium. Thus the effect of an interlayer crosstalk can be reduced or eliminated. Further, the kinds of layer intervals can be three kinds (A, B, and C) in the case of eight layers. Therefore, offset values can be set easily.

Without being limited to eight layers, of course, similar layer interval configurations to those of the foregoing first embodiment can be adopted when four or more recording layers are formed. Even when the number of layers is greatly increased as in cases of 20 layers, 32 layers, or the like in particular, offset values are set easily because the kinds of layer intervals are a minimum.

Further, even when the recording and reproducing device 10 does not store offset values, a process of determining an offset value according to a recording layer as an object of recording or reproduction by a simple calculation is also made possible because of a regular layer interval configuration based on an AB block as in the 32-layer recording medium described above.

In addition, when a fact that no recording layers are formed in the bulk recording medium 1 in a state of a so-called virgin disk is taken into consideration, a mode of use in which the number of layers is determined at a time of recording is also assumed. In such a case, when a regular layer interval configuration with a minimum of kinds of layer intervals as described in the first embodiment is adopted, the recording and reproducing device 10 can easily set appropriate offset values.

| Explanation of Reference Symbols | |
|---|---|
| 1 | Bulk recording medium |
| 2, 11 | Cover layer |
| 3 | Reference plane |
| 5 | Bulk layer |
| 10 | Recording and reproducing device |
| 12 | Substrate |
| 21 | Objective lens |
| 22 | Actuator |
| 37 | Tilt servo circuit |
| L0, L1, L2 | Recording layer |
| SP1, SP2, SP3 | Spacer layer |

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An optical recording medium comprising:
   N recording layers (where N≥4);
   a number of kinds of layer intervals between the recording layers adjacent to each other being an integer M equal to or less than a minimum integer equal to or more than $\log_2(N)$; and
   one or more blocks including four recording layers with a first layer interval, a second layer interval, and said first layer interval formed in order in the one or more blocks,
   wherein a number of the recording layers is such that said M as the number of kinds of layer intervals is M≥3,
   wherein the optical recording medium has each of parts of respective layer intervals from a third layer interval to an Mth layer interval as a layer interval between a recording layer forming said block and a recording layer adjacent to said recording layer, the adjacent recording layer being included in other than the block including said recording layer, and
   wherein said first layer interval<said second layer interval<the third layer interval< . . . <the Mth layer interval.

2. The optical recording medium according to claim 1, wherein
   the optical recording medium has five to eight recording layers, and said M=3, and
   the optical recording medium has a part of a third layer interval as a layer interval between a recording layer forming said block and a recording layer adjacent to said recording layer, the adjacent recording layer being included in other than the block including said recording layer.

3. The optical recording medium according to claim 1, wherein
   the optical recording medium has 9 to 16 recording layers, and said M=4, and
   the optical recording medium has each of a part of a third layer interval and a part of a fourth layer interval as a layer interval between a recording layer forming said block and a recording layer adjacent to said recording layer, the adjacent recording layer being included in other than the block including said recording layer.

4. The optical recording medium according to claim 1, wherein
   the optical recording medium has 17 to 32 recording layers, and said M=5, and
   the optical recording medium has each of a part of a third layer interval, a part of a fourth layer interval, and a part of a fifth layer interval as a layer interval between a recording layer forming said block and a recording layer adjacent to said recording layer, the adjacent recording layer being included in other than the block including said recording layer.

5. The optical recording medium according to claim 1, wherein
   when the number of the recording layers is $N=2^y$ (y is an integer of three or more),
   said Mth layer interval is set between an (N/2)th recording layer and an {(N/2)+1}th recording layer,
   a first recording layer to the (N/2)th recording layer and the {(N/2)+1}th recording layer to an Nth recording layer each have at least one or more said blocks, and
   settings of respective layer intervals from the first recording layer to the (N/2)th recording layer are identical to settings of respective layer intervals from the {(N/2)+1}th recording layer to the Nth recording layer.

6. The optical recording medium according to claim 1, wherein
   when the number N of recording layers is $2^{y-1}<N<2^y$ (y is an integer of three or more),
   the N recording layers are formed with layer interval settings in a case of extracting N consecutive recording layers from a first recording layer to an N'th recording layer when assuming that $N'=2^y$, that said Mth layer interval is set between an (N'/2)th recording layer and an {(N'/2)+1}th recording layer for the number M of kinds of layer intervals, that the first recording layer to the (N'/2)th recording layer and the {(N'/2)+1}th recording layer to the N'th recording layer each have at least one or more said blocks, and that settings of respective layer intervals from the first recording layer to the (N'/2)th recording layer are identical to settings of respective layer intervals from the {(N'/2)+1}th recording layer to the N'th recording layer.

7. The optical recording medium according to claim 1, wherein
   a minimum layer interval among the first layer interval to an Mth layer interval is 12.4·λ/NA/tan(a sin(NA/n))

where λ is a wavelength of reproduction light on the optical recording medium, an NA is a numerical aperture of a reproducing optical system, and n is an index of refraction between recording layers.

8. A recording device comprising:
   an optical pickup for irradiating, with laser light, an optical recording medium having a bulk layer in which to record optical recording information by irradiation with laser light and form a plurality of recording layers in which the optical recording information is recorded;
   a focus control section configured to control a focal position of the laser light within said bulk layer; and
   a control section configured to give an instruction on the focal position to said focus control section so that each recording layer is formed by recording operation with said laser light such that N recording layers (where N≥4) are formed within said bulk layer, a number of kinds of layer intervals between the recording layers adjacent to each other is an integer M equal to or less than a minimum integer equal to or more than $\log_2(N)$, and the bulk layer has one or more blocks including four recording layers with a first layer interval, a second layer interval, and said first layer interval formed in order in the one or more blocks, wherein a number of the recording layers is such that said M as the number of kinds of layer intervals is $M \geq 3$, wherein the optical recording medium has each of parts of respective layer intervals from a third layer interval to an Mth layer interval as a layer interval between a recording layer forming said block and a recording layer adjacent to said recording layer, the adjacent recording layer being included in other than the block including said recording layer, and wherein said first layer interval<said second layer interval<the third layer interval< . . . <the Mth layer interval.

9. A recording method of a recording device, the recording device including an optical pickup for irradiating, with laser light, an optical recording medium having a bulk layer in which to record optical recording information by irradiation with laser light and form a plurality of recording layers in which the optical recording information is recorded, and a focus control section configured to control a focal position of the laser light within said bulk layer, the recording method comprising:

performing recording operation with said laser light after said focus control section controls the focal position according to each recording layer, so as to form each recording layer such that N recording layers (where $N \geq 4$) are formed within said bulk layer, a number of kinds of layer intervals between the recording layers adjacent to each other is an integer M equal to or less than a minimum integer equal to or more than $\log_2(N)$, and the bulk layer has one or more blocks including four recording layers with a first layer interval, a second layer interval, and said first layer interval formed in order in the one or more blocks, wherein a number of the recording layers is such that said M as the number of kinds of layer intervals is $M \geq 3$, wherein the optical recording medium has each of parts of respective layer intervals from a third layer interval to an Mth layer interval as a layer interval between a recording layer forming said block and a recording layer adjacent to said recording layer, the adjacent recording layer being included in other than the block including said recording layer, and wherein said first layer interval<said second layer interval<the third layer interval< . . . <the Mth layer interval.

* * * * *

UNITED STATES PATENT AND TRADEMARK OFFICE
CERTIFICATE OF CORRECTION

| | | |
|---|---|---|
| PATENT NO. | : 8,553,514 B2 | Page 1 of 1 |
| APPLICATION NO. | : 13/521976 | |
| DATED | : October 8, 2013 | |
| INVENTOR(S) | : Saito et al. | |

It is certified that error appears in the above-identified patent and that said Letters Patent is hereby corrected as shown below:

ON THE TITLE PAGE:

Item (75), in the "Inventor" section, please replace

"Kimihiro Saito, Tokyo (JP); Seiji Kobayashi, Tokyo (JP)" with

--Kimihiro Saito, Kanagawa (JP); Seiji Kobayashi, Kanagawa (JP)--.

Signed and Sealed this
Third Day of June, 2014

Michelle K. Lee
*Deputy Director of the United States Patent and Trademark Office*